(12) United States Patent
Newton et al.

(10) Patent No.: US 6,173,100 B1
(45) Date of Patent: Jan. 9, 2001

(54) CABLES WITH WATER-BLOCKING AND FLAME-RETARDING TAPES

(75) Inventors: Wayne M. Newton, Lilburn; Jim J. Sheu, Dunwoody; Carla G. Wilson, Conyers; Mark I. Shmukler, Alpharetta; Jennifer R. Meeks, Lawrenceville, all of GA (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/258,533

(22) Filed: Feb. 26, 1999

(51) Int. Cl.[7] .................................................. G02B 6/44
(52) U.S. Cl. .................... 385/102; 385/104; 385/105; 385/106; 385/109
(58) Field of Search ........................... 385/102, 104, 385/105, 106, 109

(56) References Cited

U.S. PATENT DOCUMENTS

| | | | |
|---|---|---|---|
| 4,867,526 | 9/1989 | Arroyo | 350/96.23 |
| 5,133,034 | * 7/1992 | Arroyo | 385/107 |
| 5,163,115 | 11/1992 | Sheu | 385/100 |
| 5,243,675 | * 9/1993 | Kathiresan | 385/102 |

OTHER PUBLICATIONS

C. John Arroyo, Jim J. Sheu, and W.J. Paucke, The Use of Superabsorbent Materials in Optical Fiber Cable Design, 1991.
Fredric L. Buchholz and Nicholas A. Peppas, Superabsorbent Polymers, Science and Technology, 1993.
Fredric L. Buchholz and Andrew T. Graham, Modern Superabsorbent Polymer Technology, 1998.
Lisa–Brannon–Peppas and Ronald S. Harland, Absorbent Polymers Technology, Studies in Polymer Science 8, 1990.

* cited by examiner

*Primary Examiner*—Thong Nguyen
*Assistant Examiner*—Leo Boutsikaris

(57) ABSTRACT

A preferred embodiment of the cable of the present invention incorporates a core, an outer jacket surrounding the core, and a tape disposed between the core and the outer jacket. The tape includes a first layer and superabsorbent polymers (SAPs) which are applied to the first layer. Preferably, the first layer is formed of spun bonded nonwoven polyester material, nylon spun bonded fabric, nonwoven glass, polypropylene melt blown non-woven fabric, polyurethane spun bonded fabric, or TCF cellulose fabric, among others. Additionally, the SAPs preferably are provided with a moisture content of greater than approximately 2 percent, by weight, thereby improving the flame-retarding characteristics of the tape.

15 Claims, 13 Drawing Sheets

CABLES WITH WATER-BLOCKING AND FLAME-RETARDING TAPES

CROSS-REFERENCE TO RELATED APPLICATIONS

Reference is made to U.S. patent application, Ser. No. 09/258,533 (Meeks 1–12), filed on Feb. 26, 1999.

BACKGROUND OF THE INVENTION

1. Field of the Invention

The present invention relates to cables and, in particular, to cables incorporating tapes which provide water-blocking and flame-retarding characteristics to the cables.

2. Description of the Related Art

Many products, such as telecommunications and power cables, for instance, typically are provided with one or more forms of water-blocking protection, i.e. waterproof outer jackets, water-blocking powders and yarns, etc. Generally, such water-blocking protection is intended to reduce or eliminate the possibility of water entering the product so as to reduce the potential of water damaging the product. For example, once water enters a telecommunications cable, such as through a splice closure of the cable, freezing of the water can induce microbending in the optical fibers of the cable, potentially resulting in fiber degradation or increased signal loss of the cable.

Heretofore, some prior art cables have incorporated water-blocking tape in order to prevent water penetration into and migration through the cables. Examples of such prior art cables are described in U.S. Pat. No. 4,867,526, issued to Arroyo, for instance. In the cables described in U.S. Pat. No. 4,867,526, water-blocking tape is disposed between the transmission media and the outer jacket of the cable, thereby forming a water-blocking barrier around the transmission media, i.e. optical fibers. The water-blocking tape incorporates superabsorbent materials, e.g. superabsorbent polymers (SAPs), which can absorb up to about one thousand (1000) times their weight in distilled water. The SAPs are provided in a loading of approximately 3.8–6.22 g/ft$^2$, which results in a tape that weighs approximately 10–80% more than the substrate of the tape. Upon contact with water, the SAPs of the water-blocking tape absorb the water and swell, thereby preventing migration of the water through the cable. Additionally, the swollen SAPs form a physical barrier which can prevent more water from entering the cable.

In some applications, it is desirable to provide tapes which incorporate both water-blocking and flame-retarding characteristics. Heretofore, a prior art solution to attain the characteristics of water-blocking and flame-retarding has been to add flame-retardants to the SAPs of the tapes. However, adding flame-retardants to the SAPs oftentimes results in a tape which has reduced water-blocking characteristics as compared to the tape without the flame-retardants. Primarily, this is due to the chemical properties of the prior art flame-retardants which, typically, are salts or ionic compounds and are known to reduce the swelling of water-blocking materials. Generally, as more prior art flame-retardants are added to SAPs in an effort to improve the flame-retarding characteristics, the greater the water-blocking capacity of the SAPs is reduced. Frequently, the extent of reduction in water-blocking capacity of SAPs due to the incorporation of prior art flame-retardants can render the SAPs incapable of preventing water penetration.

Therefore, there is a need to provide improved cables and tapes which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to water-blocking tapes and cables with flame-retarding characteristics. In a preferred embodiment, a tape incorporates a first layer and SAPs, with the SAPs being applied to the first layer. Preferably, the first layer is formed of spun bonded non-woven polyester material, nylon spun bonded fabric, non-woven glass, polypropylene melt blown non-woven fabric, polyurethane spun bonded fabric, or TCF cellulose fabric, among others. Additionally, the SAPs are provided with a moisture content of greater than approximately 2 percent, by weight, thereby improving the flame-retarding characteristics of the tape.

In accordance with another aspect of the present invention, an embodiment of the tape incorporates greater than 6.22 grams, preferably at least 8 grams, of SAPs per square foot. Preferably, the SAPs include polyacrylates, polyacrylamides, polyvinylalcohols, and copolymers thereof, among others. In some embodiments, the SAPs can comprise at least 50% of the total weight of the tape.

In accordance with another aspect of the present invention, some embodiments of the tape can be configured with a second layer, with the SAPs being disposed between the first and second layers. Preferably, the tape is less than approximately 0.016 inches thick.

In accordance with still another aspect of the present invention, cables, such as telecommunications and power cables, for instance, are provided that possess water-blocking and flame-retarding characteristics. In a preferred embodiment, a cable of the present invention incorporates a core, an outer jacket surrounding the core, and tape disposed between the core and the outer jacket. The tape includes a first layer and SAPs, with the SAPs having a moisture content of greater than approximately 2 percent, by weight.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
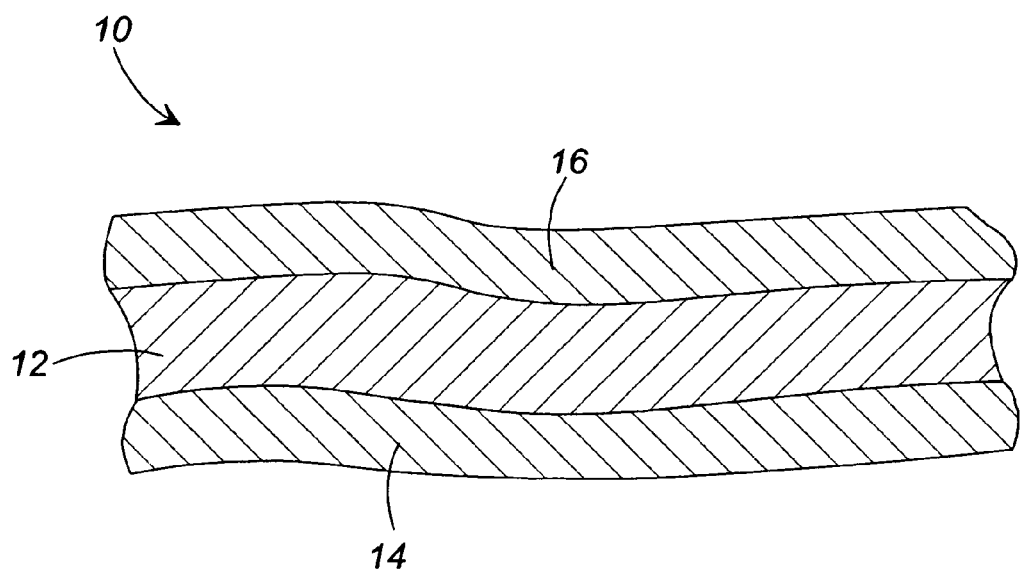
FIG. 1 is a partially cut-away cross-sectional view of a preferred embodiment of the present invention.

Reference will now be made in detail to the description of the present invention as illustrated in the drawings, wherein like reference numbers indicate like parts throughout the several views. In accordance with an aspect of the present invention, a water-blocking tape is provided which possesses heretofore unrecognized flame-retarding characteristics. As shown in FIG. 1, a preferred embodiment of the tape 10 of the present invention incorporates SAPs 12, such as polyacrylates, polyacrylamides, polyvinylalcohols, copolymers of polyacrylates, copolymers of polyacrylamides, copolymers of polyvinylalcohols, copolymers of polyacrylates and polyacrylamides, copolymers of polyacrylates and polyvinylalcohols, and copolymers of polyacrylamides and polyvinylalcohols, and combinations thereof, among others, which are disposed between a lower layer 14 and an upper layer 16 of the tape. In a preferred embodiment, the SAPs are provided in a loading of approximately 8 g/ft$^2$, with the SAPs typically comprising at least 50% of the weight of the tape.

Layers 14 and 16 preferably are formed of a spun bonded non-woven polyester material, although other materials can be utilized, i.e., nylon spun bonded fabric, non-woven glass, polypropylene melt blown non-woven fabric, polyurethane spun bonded fabric or TCF cellulose fabric. The fibers of the layers 14 and 16 are configured so as to form a matrix for bonding with and retaining the SAPs primarily between the layers. Although the preferred embodiment shown in FIG. 1 incorporates both an upper and lower layer of the tape, other embodiments can incorporate a single substrate layer upon which the SAPs are applied or impregnated. Typically, the thickness of the tape is greater than approximately 0.01 inches, preferably smaller than approximately 0.016 inches.

In order to form tape 10, lower layer 14 is loaded or impregnated with SAPs 12 in a known manner, such as in described U.S. Pat. No. 4,867,526, issued to Arroyo, for instance. Additionally, the moisture content of the SAPs can be adjusted, depending on the particular application (as described hereinafter). After lower layer 14 has been impregnated with SAPs 12, the upper layer 16 is then applied to the SAPs.

As described hereinbefore, a prior art solution to achieve the desired characteristics of water-blocking and flame-retarding in tapes has been to add prior art flame-retardants, such as magnesium hydroxide or zinc borates, among others, which are salts or ionic compounds, to the SAPs of the tapes. However, when prior art flame-retardants are added to the SAPs of the tapes, the SAPs' ability to absorb water can be significantly reduced, thereby resulting in tapes with marginal water-blocking capability. For example, a gram of SAPs typically can absorb approximately 1000 ml of distilled water. However, a gram of the same SAPs typically can absorb up to approximately 50 ml of sea water, which commonly includes multiple ion species, i.e. monovalent and divalent ions of sodium, magnesium, etc.

The mechanism by which SAPs absorb and retain water can be described in two ways, e.g., physical absorption and chemical absorption. In physical absorption, aqueous fluid wets the surface of a SAP and is physically distributed into and throughout the network (or matrix) of the SAP. Since the aqueous fluid moves in columns of continuous fluid, the physical absorption of SAP depends upon factors such as pore size, specific gravity, viscosity, surface tension and contact angle, with surface tension and contact angle affecting the wettability of SAP. Chemical absorption, however, occurs on a molecular level. In chemical absorption, aqueous fluid interacts with polymer chains of a SAP via solvation and hydrogen bonding. Additionally, factors such as diffusion, porosity of the SAP network, electrostatic attraction and repulsion affect the chemical absorption of SAPs.

Figure 2:
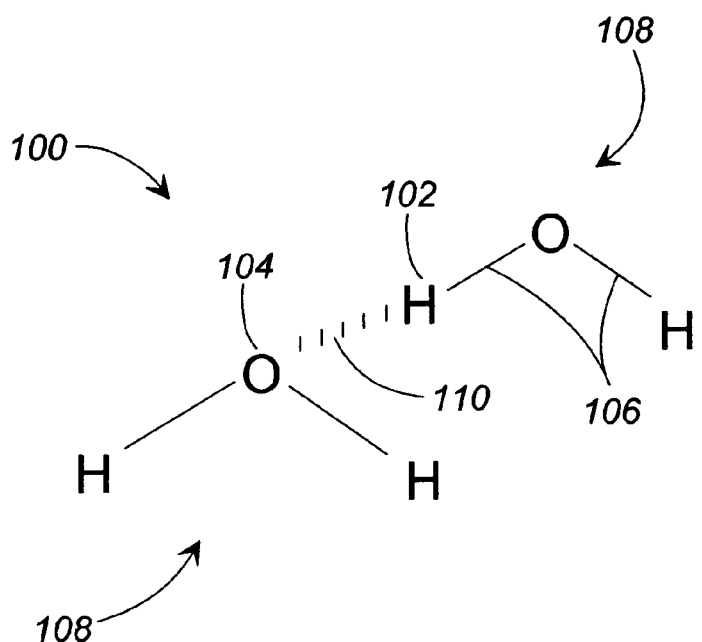
FIG. 2 is a schematic diagram illustrating the principle of hydrogen bonding.

Whether SAPs absorb aqueous fluid via physical absorption and/or chemical absorption, an important driving force for absorption appears to be hydrogen bonding. As shown in FIG. 2, water 100 includes hydrogen atoms (H) 102 and oxygen atoms (O) 104 which are bonded via covalent bonds 106 to form water molecules 108. Water molecules 108 are bonded to each other by a hydrogen bond 110 which is formed between the oxygen atom 104 of a molecule 108 and a hydrogen atom 102 of another molecule 108. The energy for hydrogen bonding of water has been found to be about 5 k-cal/mole. This energy is significant considering the strong covalent bond energy of the O—H bond 106 in water (e.g., 50–100 k cal/mole).

Typically, SAPs include polyacrylates derived from acrylic acids and incorporate counter ions, i.e. sodium, potassium, etc. The SAPs generally are formed as crosslinked polyacrylates, with the nature of the SAP network and the insolubility of the polymer in water being attributed to the crosslinking. Chemically, the major functional groups in polyacrylates are carboxylates, with the carboxylates absorbing water through hydrogen bonding. Other functional groups, such as amides, for instance, also are known to absorb water through hydrogen bonding; however, the water-absorbing characteristics of amides are quite different form the water-absorbing characteristics of carboxylates, as described hereinafter.

Figure 3:
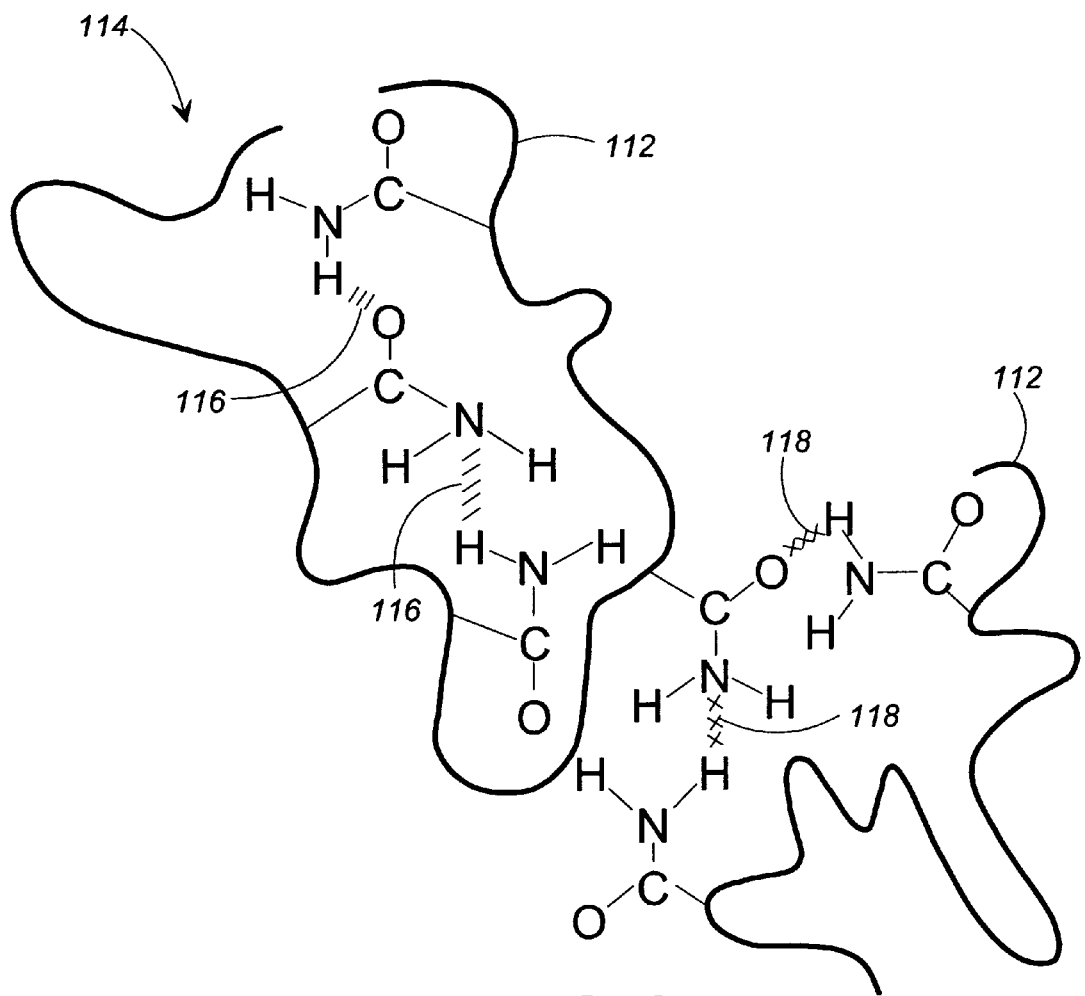
FIG. 3 is a schematic diagram illustrating hydrogen bonding in representative polyacrylamide polymer molecules.

When dissolved in water (FIG. 3), individual polymer chains 112 of a water soluble polymer 114, i.e., polyacrylamide, for instance, typically exhibit two types of hydrogen bonding, e.g., intramolecular hydrogen bonding 116 and intermolecular hydrogen bonding 118. Intramolecular hydrogen bonding tends to pull the individual polymer chains together, thereby causing the individual polymer chains to fold and/or curl. As a result of this folding and/or curling, the molecular volume of the water soluble polymer in water, e.g., the hydrodynamic volume, is relatively small. The polymer's influence on the water is small if the hydrodynamic volume of the polymer is small. For example, the viscosity of a polymer solution approaches the viscosity of water as the hydrodynamic volume of the polymer solution is greatly reduced. In the case of polyacrylamide, intermolecular hydrogen bonding also pulls the polymer chains together. Typically, the polymer chains not only curl or coil individually, they also tend to form bundles with other polymer chains (not shown). Thus, the effective hydrodynamic volume of polyacrylamide is low, resulting in a low viscosity of the polymer in solution.

Figure 4:
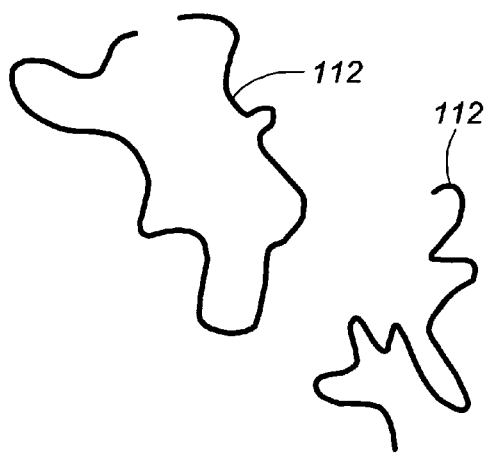
FIG. 4 is a schematic diagram illustrating the hydrodynamic volume of non-hydrolyzed polyacrylamide polymer molecules.
Figure 5:
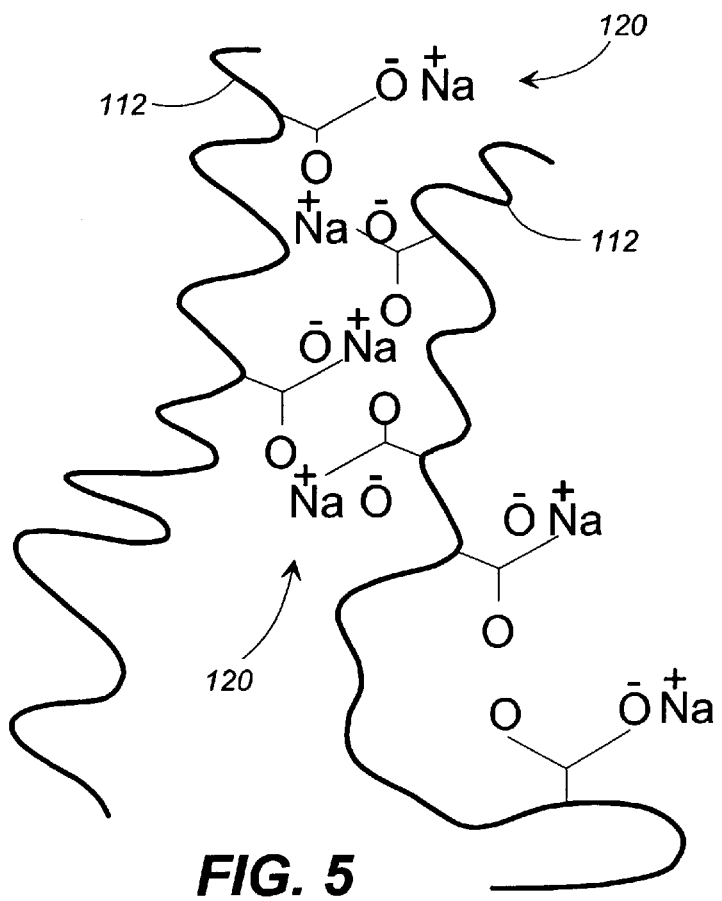
FIG. 5 is a schematic diagram illustrating the hydrodynamic volume of the polyacrylamide polymer molecules of FIG. 3 after the molecules have been partially hydrolyzed.

Amide groups in the polymer chains 112 of polyacrylamide (FIG. 4) can be hydrolyzed to form carboxylate groups 120 (FIG. 5), i.e., the same functional groups in polyacrylates or SAP, thereby forming intermolecular as well as intramolecular charge repulsions between the polymer chains 112 of the polyacrylamide. These repulsions extend beyond the hydrodynamic volume of polyacrylates and can result in a much higher viscosity. Carboxylates also possess a higher ability to form hydrogen bonds with water molecules, as compared to amides in polyacrylamides, for instance. Since these carboxylates are capable of forming numerous hydrogen bonds with water molecules, SAP absorbs and retains water into its matrix. At a macroscopic level, the net result is an osmotic phenomenon.

Figure 6:
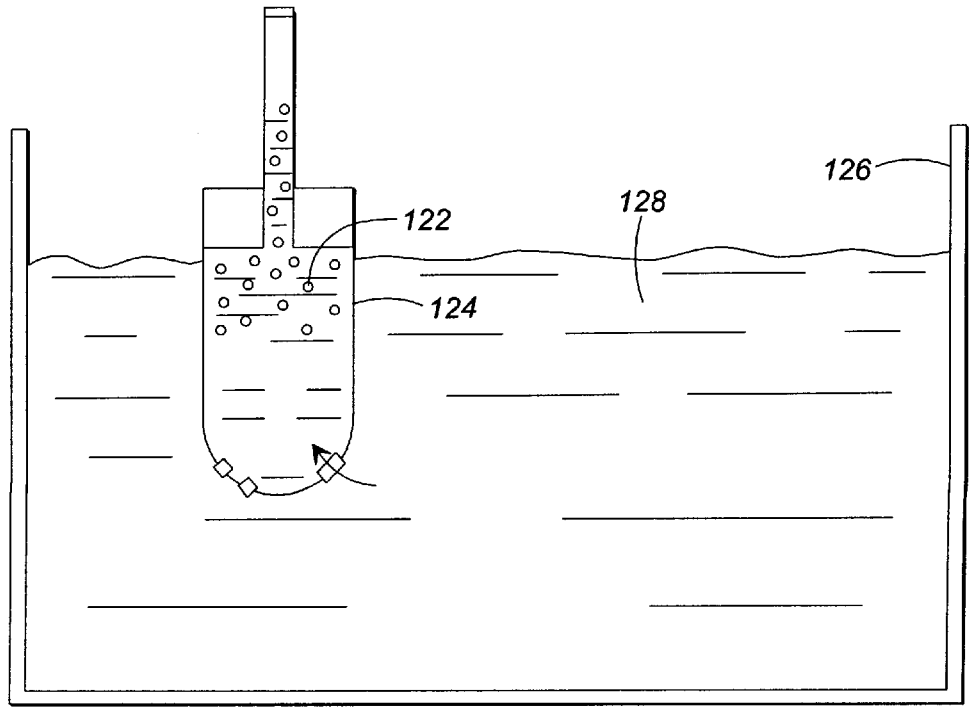
FIG. 6 is a schematic diagram illustrating the principle of osmotic pressure.

As shown in FIG. 6, a sugar solution 122 is placed inside a collodion bag 124 which is suspended in a container 126 filled with pure water 128. So configured, solution 122 has a higher solute concentration than the solute concentration of water 128, thereby creating a concentration gradient. The concentration gradient between solution 122 and water 128 results in an osmotic pressure gradient which drives water 128 into bag 124. The network of a SAP behaves in much the same manner. As in the previous example, if the network of SAP is considered as a separate entity from a surrounding aqueous fluid, a pressure gradient potentially exists between the two entities. Physically, such a pressure gradient is, in effect, an osmotic pressure gradient. This is why some people attribute the absorbency of SAP to osmotic pressure. Since SAP has many functional groups, such as carboxylates (electrolytes) dissolved in water, the concentration of these groups is higher inside the SAP network, likewise creating a concentration gradient. This concentration gradient results in an osmotic pressure gradient between the SAP network and the surrounding aqueous fluid, and therefore, drives the aqueous fluid into the SAP network.

The manner in which a SAP network is constructed can significantly influence the absorbency of the SAP. Generally, a SAP network is built via crosslinking of polymer chains. The amount of crosslinking should be maintained at an optimum level depending on the particular application, such as when a high rate of absorption or a high capacity for absorbing water is desired of the SAP, for example. Additionally, crosslinking determines the spaces or voids within the SAP network, thereby influencing the total volume of the SAP. This, in turn, influences the concentration of functional groups within the network.

As mentioned hereinbefore, the ability of SAPs to absorb sea water is significantly less than the ability of the SAPs to absorb distilled water. There are several reasons for this. First, the carboxylates of SAPs are sensitive to electrolytes, i.e. salts. As SAPs are exposed to salt, a reduced water-absorbing capability of the SAPs occurs because the osmotic pressure gradient between the network of SAPs and the external salt solution decreases. For example, when the surrounding aqueous solution changes from distilled water (zero concentration in functional groups of electrolytes) to sea water (approximately three percent in various electrolytes), the concentration gradient decreases, thus causing the osmotic pressure gradient to decrease. This decrease in osmotic pressure gradient results in a decrease in absorbency of the SAP.

A second reason for the reduction in water-absorbing capability of SAPs is an effect referred to as "common ion effect," which also decreases the osmotic pressure. A third reason for the decrease in absorbency is multivalent ion complexation. In a multivalent ion environment, a multivalent ion will complex with carboxylates and limit polymer chain extension and charge repulsion between the carboxylate ions which, in turn, reduces water absorbency. A well known phenomena in water soluble polymer chemistry is referred to as "salting out." A carboxylate containing water soluble polymer solution can be turned easily into a precipitation of polymer separated from aqueous solution by the addition of a multivalent ion, such as magnesium, for instance. Magnesium and other multivalent ions exist in sea water in low concentrations. The multivalent charges on the magnesium ion will attract and complex with carboxylates in polymer chains. In effect, the complexation of these polymer chains increases the "effective" molecular weight of the polymer which becomes insoluble in water and precipitates out of solution. In the case of carboxylate containing SAPs, the net effect of complexation of multivalent ions with carboxylates is crosslinking. The addition of such complexation or crosslinking upsets the optimum level of crosslinking introduced when SAPs are made. Therefore, the absorbency of the SAP is altered accordingly. This occurs in addition to the aforementioned drops in osmotic pressure gradients, when SAPs are exposed to any salt solution, not necessarily multivalent salts.

As discussed hereinbefore, a tape possessing the combined characteristics of water-blocking and flame-retarding is desired in many applications. Heretofore, a prior art solution to provide the desired characteristics of water-blocking and flame-retarding to a tape has been to add flame-retardants to SAPs of the tape. Prior art non-halogen flame-retardants are preferred in many applications because they do not release acidic or toxic halogen containing acid/gas during burning. However, the addition of prior art flame-retardants oftentimes results in a SAP composition which has reduced water-blocking characteristics as compared to the SAP before the flame-retardants were added. Primarily, this is due to the chemical nature of the prior art flame-retardants. Generally, as more prior art flame-retardants are added to a SAP in an effort to improve its flame-retarding characteristics, the water-blocking capacity of the SAP is further reduced. Frequently, the extent of reduction in water-blocking capacity of a SAP due to incorporation of flame-retardants can render the SAPs virtually incapable of preventing water penetration. Examples of prior art non-halogen flame-retardants include magnesium hydroxide, zinc borates, zinc boro phosphates, and antimony oxides.

It has been discovered that SAPs possess heretofore unknown flame-retarding characteristics. Moreover, in accordance with the present invention (as shown in detail hereinafter), SAPs can be utilized as flame-retardants and/or flame-retarding additives, such as by adding SAPs to the SAPs of prior art water-blocking tapes, e.g. increasing the SAPs loading of the tapes, or by increasing the moisture content of the SAPs.

The mechanism or mechanisms by which the flame-retarding characteristics of materials are improved by practicing the present invention are not heretofore fully understood; however, the release of water molecules absorbed by and/or bonded to SAPs, the release of carbon dioxide molecules from the carboxylates of the SAPs, as well as the release of nitrogen and consumption of oxygen are considered important. Typically, in order to stop a fire, it is necessary to stop the combustion reaction of the fire. Fires generally are controlled and extinguished by, among others, cooling of the burning substrate and separating and/or replacing an oxidizing agent (air or oxygen). For example, water is an effective fire extinguishing agent because it possesses higher specific and latent heats (heat of evaporation, etc.) than those of most other extinguishing agents. On the other hand, carbon dioxide extinguishes fire by blanketing and smothering, thereby preventing oxygen from reaching the fire and the substrate. Once blanketing is maintained long enough to cool the substrate below the self-ignition temperature of the substrate, the fire is extinguished.

As discussed hereinbefore, SAPs generally are capable of absorbing and bonding with water molecules. In addition, some SAPs contain polyvinylalcohols. The hydroxyl groups in polyvinlyalcohols may be converted to water molecules. During a burning process of SAPs, water molecules absorbed, bonded and/or converted typically are released, thereby helping to extinguish a flame. However, even when no excess water has been absorbed into the network of the SAPs, as described in detail hereinafter, the SAPs typically exhibit the aforementioned improvement in flame-retarding characteristics. Therefore, it is hypothesized that carbon dioxide molecules of the SAPs also may be released during burning, such as from the carboxylates of polyacrylic acids and polyacrylates, thereby helping to extinguish the flame. In the case of SAPs consisting of copolymers of polyacrylamide and polyacrylate, the amide groups may be converted by oxygen to give nitrogen, carbon dioxide and water during the burning process. Nitrogen is known to have some flame-retardant action. At high temperatures, the nitrogen may also be further oxidized by oxygen, and thus consume more oxygen. As mentioned hereinbefore, both carbon dioxide and water help in extinguishing fire. In order to demonstrate the aforementioned water-blocking and flame-retarding characteristics of the present invention, six series of tests (e.g. test series I–VI) were conducted. The first and second series of tests were utilized to determine the limiting oxygen indexes (LOIs) of SAPs samples, the third series was utilized to determine the heat of combustion of SAPs samples, the fourth series was utilized to determine the LOIs of representative product specimens (e.g. tape samples), the fifth series was utilized to determine the absorbency of representative product specimens, and the sixth series was utilized to determine the effect of increasing amounts of salts and prior art flame retardants on the absorbency of SAPs samples.

Test samples were prepared utilizing three commercially available SAPs: ELF Atochem XFS, a polyacrylate type of SAP manufactured by Elf Atochem; Aqua Keep J550A, a polyacrylate type of SAP manufactured by Sumitomo Seika Chemicals; and, CA-100, a copolymer of polyacrylate and polyacrylamide types of SAPs manufactured by Stockhausen, Inc. Since particle size can affect the burning characteristics of material, particle size distributions for the SAPs utilized during the tests are set forth hereinafter in Tables 1–3.

TABLE 1

Particle Size Distribution (XFS)

| U.S. Standard Testing Sieve No. | Microns | Mass (g) | % (wt) |
|---|---|---|---|
| 20 | >850 | 0.0000 | 0.0 |
| 50 | 300–849 | 3.4774 | 2.3 |
| 60 | 250–299 | 3.4659 | 2.3 |
| 100 | 150–249 | 37.8439 | 25.3 |
| 140 | 106–149 | 64.372 | 43.0 |
| 200 | 75–105 | 25.0401 | 16.7 |
| 325 | 45–74 | 11.9072 | 8.0 |
| collection tray | 0–44 | 3.5219 | 2.4 |

TABLE 2

Particle Size Distribution (J550A)

| U.S. Standard Testing Sieve No. | Microns | Mass (g) | % (wt) |
|---|---|---|---|
| 20 | >850 | 0.0032 | 0.0 |
| 50 | 300–849 | 21.5608 | 14.1 |
| 60 | 250–299 | 16.8709 | 11.0 |
| 100 | 150–249 | 73.636 | 48.1 |
| 140 | 106–149 | 26.8356 | 17.5 |
| 200 | 75–105 | 8.9702 | 5.9 |
| 325 | 45–74 | 3.868 | 2.5 |
| collection tray | 0–44 | 1.2656 | 0.8 |

TABLE 3

Particle Size Distribution (CA-100)

| U.S. Standard Testing Sieve No. | Microns | Mass (g) | % (wt) |
|---|---|---|---|
| 20 | >850 | 2.2130 | 1.8 |
| 50 | 300–849 | 16.4482 | 13.6 |
| 60 | 250–299 | 4.4415 | 3.7 |
| 100 | 150–249 | 5.9787 | 4.9 |
| 140 | 106–149 | 4.6690 | 3.9 |
| 200 | 75–105 | 33.9538 | 28.1 |
| 325 | 45–74 | 29.3455 | 24.3 |
| collection tray | 0–44 | 23.7671 | 19.7 |

Figure 7:
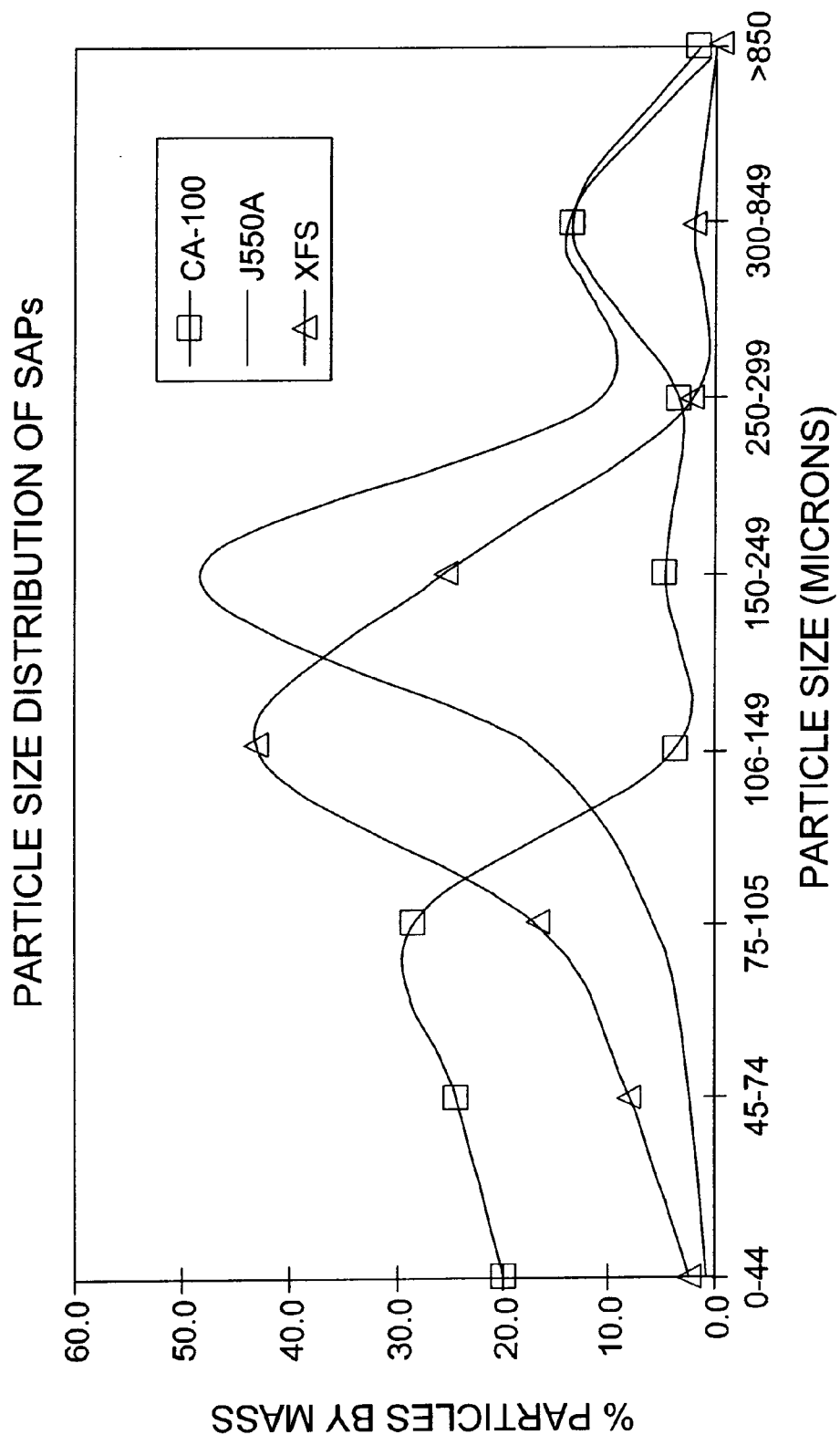
FIG. 7 is a graph illustrating Particle Size Distributions in percentage of mass of representative SAPs utilized in the composition.
Figure 8:
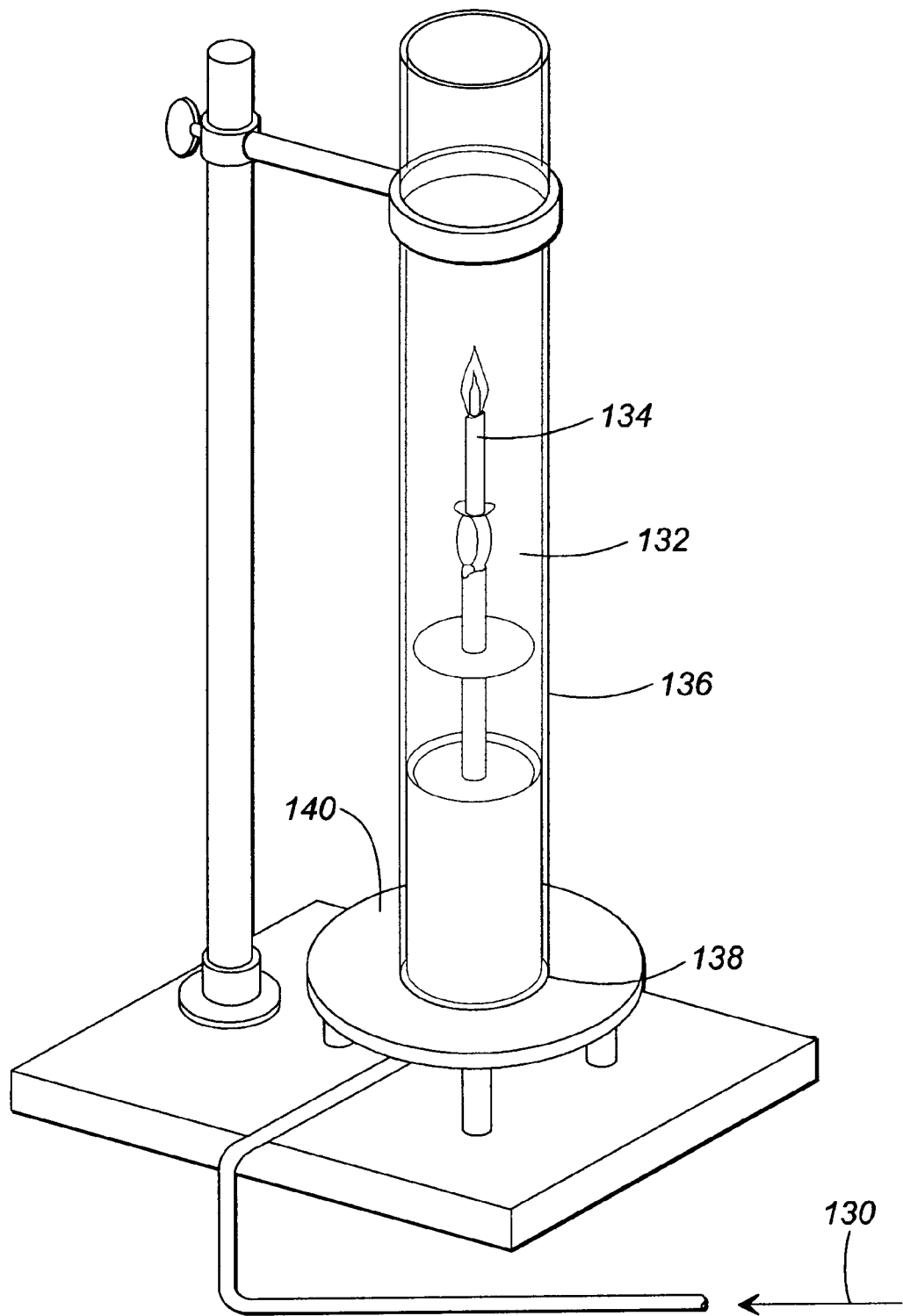
FIG. 8 is a perspective view of representative test equipment utilized in analyzing physical properties of SAPs and tapes formed in accordance with the present invention.

Comparisons of the data in Tables 1–3 are also shown in FIG. 7.

Test Series I

The first series of tests (examples 1-1 through 1-2, described hereinafter) was conducted in accordance with standard ASTM procedures (designation: D 2863-95). These tests were used to measure the minimum oxygen concentrations required to support candle-like combustion of SAPs. As described in greater detail hereinafter, the SAPs were blended with a plastic, e.g. DYNK (a non-halogen, unstabilized polyethylene, available from Union Carbide Corporation), in order to test the SAPs' flame-retardant characteristics when formed with a product. DYNK was chosen as a representative product due to the prevalence of its use in commercial applications, its relative ease of burning, and the need to improve its flame-retarding characteristics. It should be understood by one of skill in the art, however, that although the test data reproduced hereinafter was recorded from testing of DYNK incorporating SAPs, the test data clearly supports the conclusion that the improved flame-retarding characteristics exhibited by the DYNK specimens are a result of the SAP and not any inherent physical properties of the DYNK.

Some samples of the first series (examples 1-3 through 1-5, described hereinafter) were tested using a modified version of the aforementioned ASTM procedures. These tests were used to measure the minimum oxygen concentrations required to support combustion of SAPs when not formed with a product (during testing, it appeared unlikely that the SAPs were able to form Type C Specimens as set forth in the ASTM Standards).

In accordance with the aforementioned ASTM test procedures, the minimum concentration of oxygen, in a mixture 130 (FIG. 7) of oxygen and nitrogen flowing upward in a test column 132, that will just support combustion was measured under equilibrium conditions of candle-like burning. The equilibrium was established by the relation between heat generated frown the combustion of a specimen 134 formed from a SAP-enriched composition, and heat lost to surroundings as measured by one of two arbitrary criteria, namely: (1) time of burning, or (2) length of composition burned. Test column 132 incorporated a heat resistant glass tube 136 which included a 75 mm minimum inside diameter and a 45 mm minimum height. The bottom 138 of the column was attached to a noncombustible base 140 which was adapted to mix and evenly distribute a gas mixture 130 entering column 132 through base 140. Each specimen 134 was placed within the column and a controlled flow of mixture 130 was allowed to enter the column. The specimen was then ignited with an ignition flame (not shown). The ignition flame was then removed and a timer started. Burning of each specimen was evaluated in accordance with standard ASTM procedures. The aforementioned procedures were then repeated with differing concentrations of oxygen until a critical concentration of oxygen was determined. Critical concentration of oxygen is defined as the lowest oxygen concentration that will yield standardized burn test results. Limiting Oxygen Index (LOI) then was calculated by the following equation:

$$LOI=(100 \times O_2)/(O_2+N_2)$$

where: $O_2$ is the volumetric flow of oxygen (mm³/s) corresponding to the critical concentration; and, $N_2$ is the volumetric flow of nitrogen (mm³/s) corresponding to the critical concentration.

EXAMPLE 1-1

Specimens in this example were made by compounding approximately 200 g of a mixture of XFS in DYNK via a compound mixer at 190° C. to form sheets of 5.3 mm in thickness. Specimens were formed by pressing each sheet into a mold that formed six rectangular sticks of 6.35 mm by 133.35 mm by 3.175 mm, with each stick weighing approximately 2.5 g. The sticks were made for each of the following compositions (wt % XFS/wt % DYNK): 0/100; 29.7/70.3; 39.1/60.9; and, 56.8/43.2. The sticks were subjected to testing as described hereinbefore. The LOI for each composition is shown hereinafter in Table 4.

TABLE 4

Limiting Oxygen Index (XFS in DYNK)

| Composition (wt % XFS) | LOI |
|---|---|
| 0 | 17.5 |
| 29.7 | 22.5 |
| 39.1 | 24.2 |
| 56.8 | 25.7 |

EXAMPLE 1-2

Specimens in this example were samples of DYNK incorporated with J550A via a compound mixer at 190° C. Specimens were formed and tested as in Example 1-1. Sticks of the following compositions were made (wt % J550A/wt % DYNK): 0/100; 9.1/90.9; and, 44.4/55.6. The LOI for each composition is shown hereinafter in Table 5.

TABLE 5

Limiting Oxygen Index (J550A in DYNK)

| Composition (wt % J550A) | LOI |
|---|---|
| 0 | 17.5 |
| 9.1 | 18.3 |
| 44.4 | 24.0 |

EXAMPLE 1-3

As mentioned hereinbefore, XFS alone was not capable of being pressed into sticks; therefore, an alternative method of determining the LOI of XFS was utilized. Approximately 4 g of XFS powder (5.55% moisture by weight) was placed in a 63.5 mm diameter and 15.875 mm deep pan. The pan was placed in the test column and the amount of oxygen and nitrogen entering the column was set. An ignition source was placed against the surface of the powder, held for approximately 3 seconds, and then removed. A stopwatch was started as soon as the ignition source was removed. The stopwatch was then stopped when no flame or no burning embers remained in the powder. The burning time was then recorded for each mixture of oxygen/nitrogen tested. Representative LOIs for XFS are provided hereinafter in Table 6.

TABLE 6

Limiting Oxygen Index (XFS, 5.55% moisture)

| LOI (%) | Time burning (seconds) |
|---|---|
| 25.1 | 0 |
| 29.9 | 0 |
| 35.3 | 1 |
| 39.0 | 1 |
| 41.0 | 55 |
| 42.3 | 70 |
| 47.5 | 126 |

EXAMPLE 1-4

The J550A alone was not capable of being pressed into sticks; therefore, the alternative method of determining LOI, as described in Example 1-3, was utilized. Representative LOIs for J550A (10.3% moisture by weight) are provided hereinafter in Table 7.

TABLE 7

Limiting Oxygen Index (J550A, 10.3% moisture)

| LOI (%) | Time burning (seconds) |
|---|---|
| 24.7 | 0 |
| 30.2 | 0 |
| 33.1 | 0 |
| 39.2 | 2 |
| 43.1 | 2 |
| 44.6 | 3 |
| 46.6 | 56 |
| 49.4 | 86 |
| 53.8 | 119 |

EXAMPLE 1-5

The LOI of CA-100 alone was determined by the alternative method described hereinbefore in Examples 1-3 and 1-4. Representative LOIs for CA-100(10.0% moisture by weight) are provided hereinafter in Table 8.

TABLE 8

Limiting Oxygen Index (CA-100, 10.0% moisture)

| LOI (%) | Time burning (seconds) |
|---|---|
| 41.6 | 0 |
| 48.3 | 0 |
| 55.9 | 0 |
| 62.4 | 1 |
| 68.9 | 5 |
| 73.O | 16 |
| 77.5 | 20 |
| 81.8 | 79 |

Test Series II

In order to demonstrate the effect of moisture content on the flame-retardance of SAPs, the LOI was determined for several sets of samples, these samples included a range of moisture contents, with the moisture contents of the specimens increasing throughout the tests.

EXAMPLE 2-1

In this example, each sample consisted of approximately 4 grams of XFS powder in a 63.5 mm diameter and 15.875 mm deep pan. Increased moisture content in the samples was attained by placing the XFS samples in a chamber set at 23° C., 70% relative humidity. The samples were "aged" in the chamber for 4 hours, stirring the samples after each hour. Testing was then carried out using the alternate method of determining LOI, as described in Test Series I. Representative LOI's for XFS (22.7% moisture) are provided hereinafter in Table 9.

TABLE 9

Limiting Oxygen Index (XFS, 22.7% moisture)

| LOI (%) | Time burning (seconds) |
|---|---|
| 39.6 | 0 |
| 44.0 | 0 |
| 50.3 | 0 |
| 49.3 | 2 |
| 51.7 | 8 |
| 53.8 | 20 |

TABLE 9-continued

Limiting Oxygen Index (XFS, 22.7% moisture)

| LOI (%) | Time burning (seconds) |
|---|---|
| 56.9 | 27 |
| 59.1 | 120 |

EXAMPLE 2-2

In this example, LOIs were determined for another set of J550A samples (these samples included a higher moisture content than the first set of J550A samples). Sample preparation, size, and testing were carried out as described in Example 2-1. Representative LOI's for J550A (23.3% moisture) are provided hereinafter in Table 10.

TABLE 10

Limiting Oxygen Index (J550A, 23.3% moisture)

| LOI (%) | Time burning (seconds) |
|---|---|
| 28.6 | 0 |
| 48.1 | 0 |
| 57.1 | 0 |
| 64.1 | 5 |
| 65.5 | 6 |
| 61.1 | 16 |
| 69.0 | 99 |

EXAMPLE 2-3

In this example, LOIs were determined for another set of CA-100 samples (these samples included a higher moisture content than the first set of CA-100 samples). Sample preparation, size, and testing were carried out as described in Example 2-1. Representative LOI's for CA-100 (21.7% moisture) are provided hereinafter in Table 11.

TABLE 11

Limiting Oxygen Index (CA-100, 21.7% moisture)

| LOI (%) | Time burning (seconds) |
|---|---|
| 46.5 | 0 |
| 61.4 | 0 |
| 69.7 | 0 |
| 83.0 | 0 |
| 99.7 | 0 |

EXAMPLE 2-4

In order to further demonstrate the effect of moisture content on the flame-retardance of SAPs, the LOI was determined for another set of XFS samples (these samples included a higher moisture content than the first and second sets of XFS samples). Each sample consisted of approximately 4 grams of powder in a 63.5 mm diameter and 15.875 mm deep pan. Increased moisture content in the samples was attained by placing the XFS samples in a chamber set at 23° C., 75% relative humidity. The samples were "aged" in the chamber for 7 hours, stirring the samples after each hour. Testing was then carried out using the alternate method of determining LOI, as described in Test Series I. Representative LOI's for XFS (28.3% moisture) are provided hereinafter in Table 12.

TABLE 12

Limiting Oxygen Index (XFS, 28.3% moisture)

| LOI (%) | Time burning (seconds) |
|---|---|
| 33.1 | 0 |
| 50.2 | 0 |
| 60.4 | 0 |
| 66.0 | 3 |
| 70.0 | 11 |
| 75.6 | 74 |
| 72.5 | 89 |
| 68.6 | 110 |

EXAMPLE 2-5

In this example, LOIs were determined for another set of J550A samples (these samples included a higher moisture content than the first and second sets of J550A samples). Sample preparation, size, and testing were carried out as described in Example 2-4. Representative LOI's for J550A (28.7% moisture) are provided hereinafter in Table 13.

TABLE 13

Limiting Oxygen Index (J550A, 28.7% moisture)

| LOI (%) | Time burning (seconds) |
|---|---|
| 34.5 | 0 |
| 49.8 | 0 |
| 62.3 | 0 |
| 70.3 | 1 |
| 78.4 | 1 |
| 80.1 | 90 |
| 79.0 | 165 |
| 83.5 | 360 |

EXAMPLE 2-6

In this example, LOIs were determined for another set of CA-100 samples (these samples included a higher moisture content than the first and second sets of CA-100 samples). Sample preparation, size, and testing were carried out as described in Example 2-4. Representative LOI's for CA-100 (26.4% moisture) are provided hereinafter in Table 14.

TABLE 14

Limiting Oxygen Index (CA-100, 26.4% moisture)

| LOI (%) | Time burning (seconds) |
|---|---|
| 76.1 | 0 |
| 80.0 | 0 |
| 86.7 | 0 |
| 92.3 | 0 |
| 99.7 | 0 |

Figure 9:
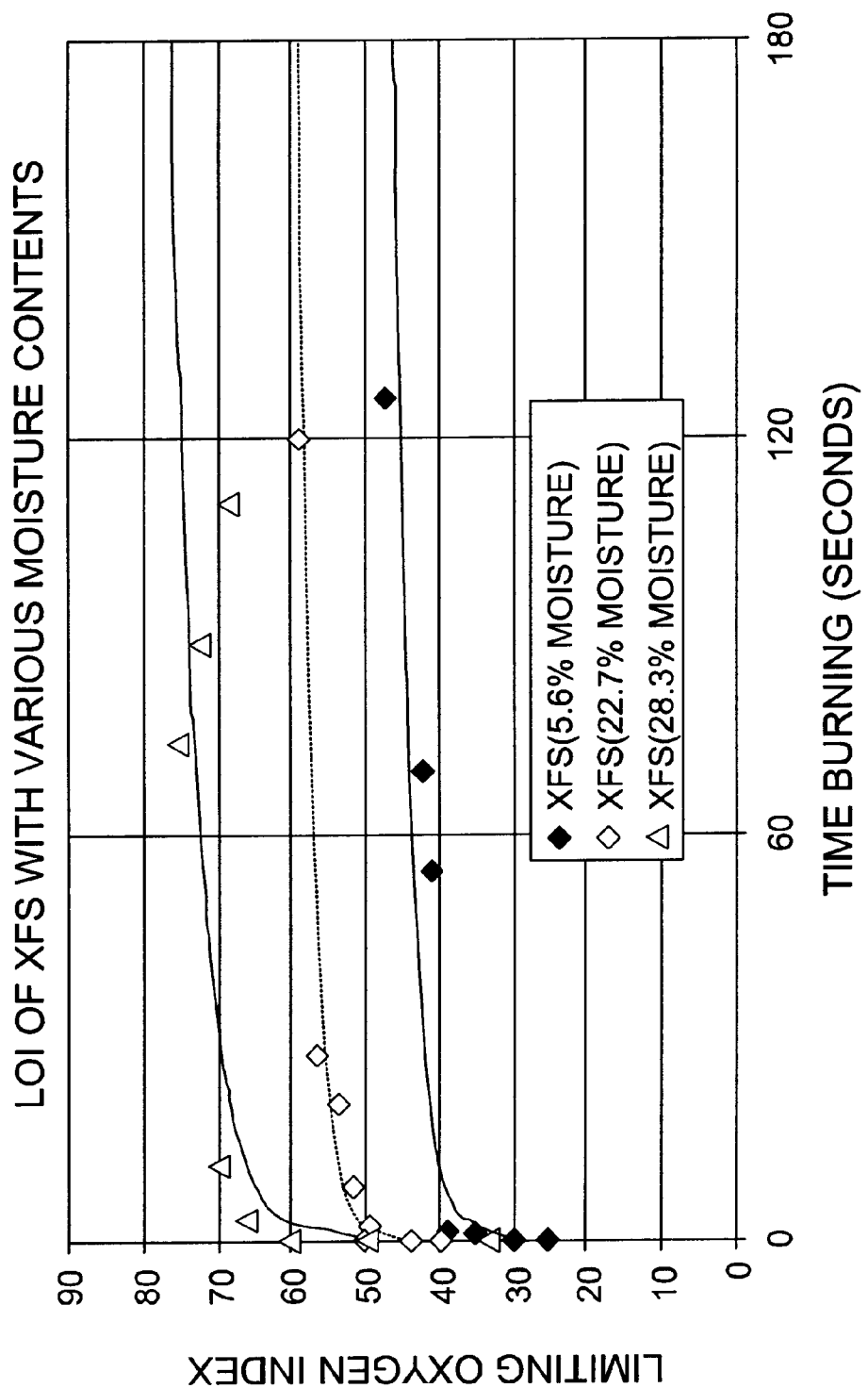
FIG. 9 is a graph illustrating Limiting Oxygen Index versus time burning for a representative SAP utilized in the present invention.
Figure 10:
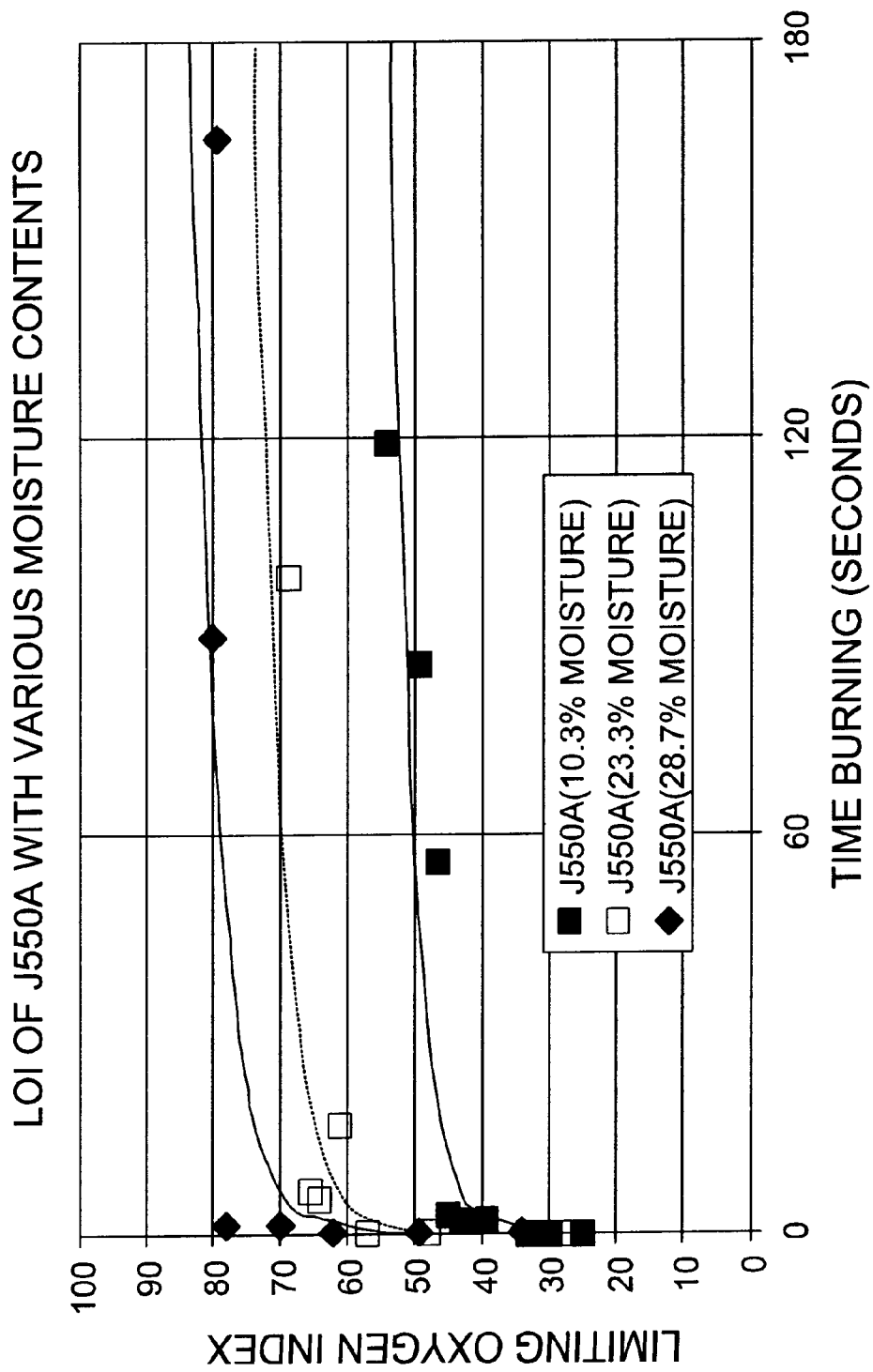
FIG. 10 is a graph illustrating Limiting Oxygen Index versus time burning for a representative SAP utilized in the present invention.
Figure 11:
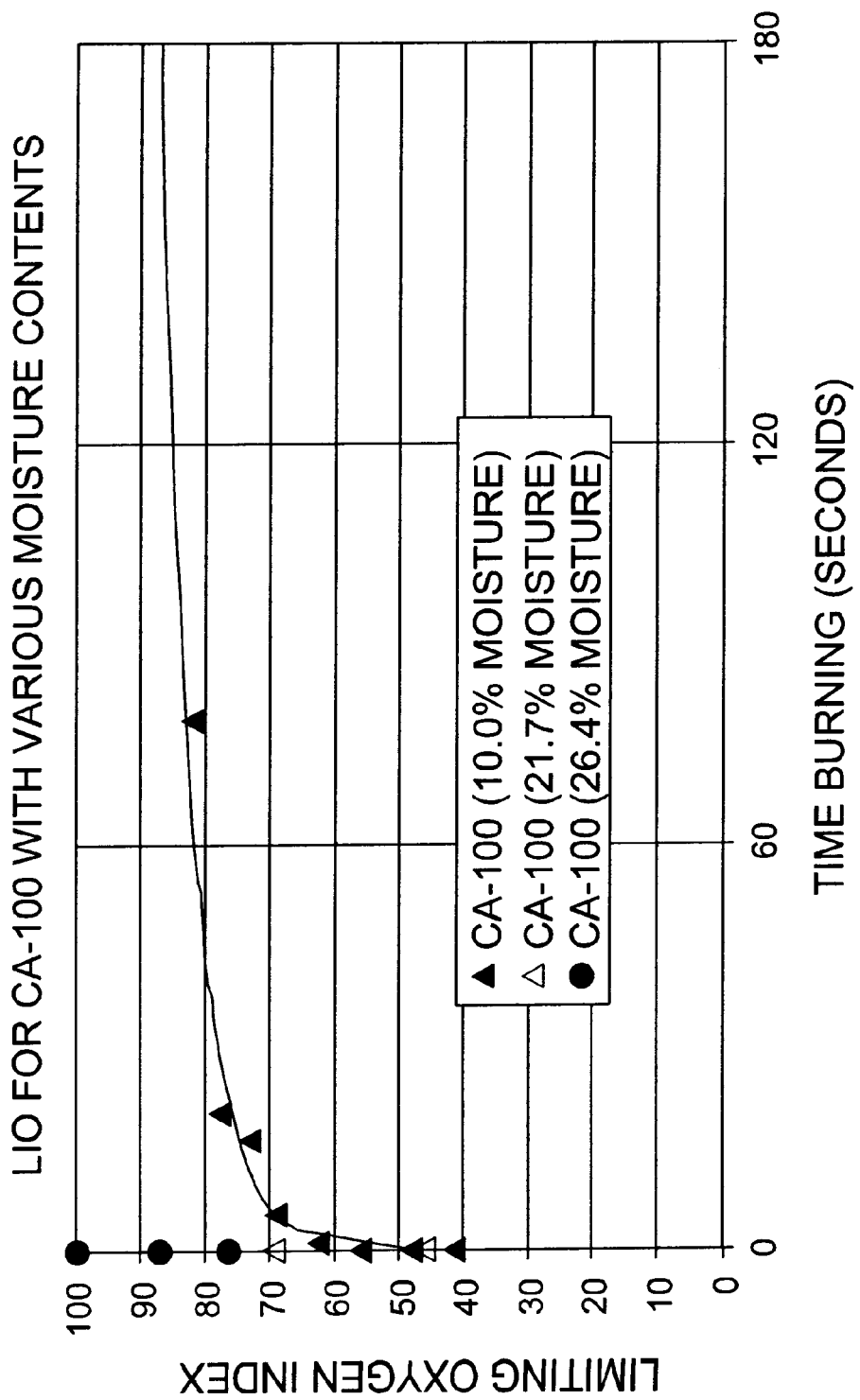
FIG. 11 is a graph illustrating Limiting Oxygen Index versus time burning for a representative SAP utilized in the present invention.

In order to compare the data presented in Examples 1-3 through 2-6, the data was plotted as shown in FIGS. 9–11. Curves were added to determine an equation that best fits each data set. The equations for these curves are provided hereinafter in Table 15.

TABLE 15

Equations for LOI versus Time Burning Curves

| Powder (% Moisture) | Equations | |
|---|---|---|
| XFS (5.6%) | $y = 2.2788 \ln(x) + 34.394$ | ($R^2 = 0.8503$) |
| XFS (22.7%) | $y = 1.98 \ln(x) + 48.869$ | ($R^2 = 0.7773$) |
| XFS (28.3%) | $y = 3.6259 \ln(x) + 57.481$ | ($R^2 = 0.668$) |
| J550A (10.3%) | $y = 3.077 \ln(x) + 37.501$ | ($R^2 = 0.8868$) |
| J550A (23.3%) | $y = 3.759 \ln(x) + 54.141$ | ($R^2 = 0.5868$) |
| J550A (28.7%) | $y = 3.885 \ln(x) + 63.069$ | ($R^2 = 0.6293$) |
| CA-100 (10.0%) | $y = 5.0468 \ln(x) + 60.622$ | ($R^2 = 0.9207$) |
| CA-100 (21.7%) | $x = 0$ | |
| CA-100 (26.4%) | $x = 0$ | |

Using these equations, where "x" is "time burned" in seconds and "y" is "LOI", limiting oxygen indexes were calculated for each powder at a time of 1 minute in order to further compare the flame-retardance of each moisture/powder combination. The results are provided hereinafter in Table 16.

TABLE 16

Limiting Oxygen Index

| Powder (% moisture) | LOI (1 minute) |
|---|---|
| XFS (5.6%) | 43.7 |
| XFS (22.7%) | 57.0 |
| XFS (28.3%) | 72.3 |
| J550A (10.3%) | 50.1 |
| J550A (23.3%) | 69.5 |
| J550A (28.7%) | 79.0 |
| CA-100 (10.0%) | 81.3 |
| CA-100 (21.7%) | No burning |
| CA-100 (26.4%) | No burning |

Figure 12:
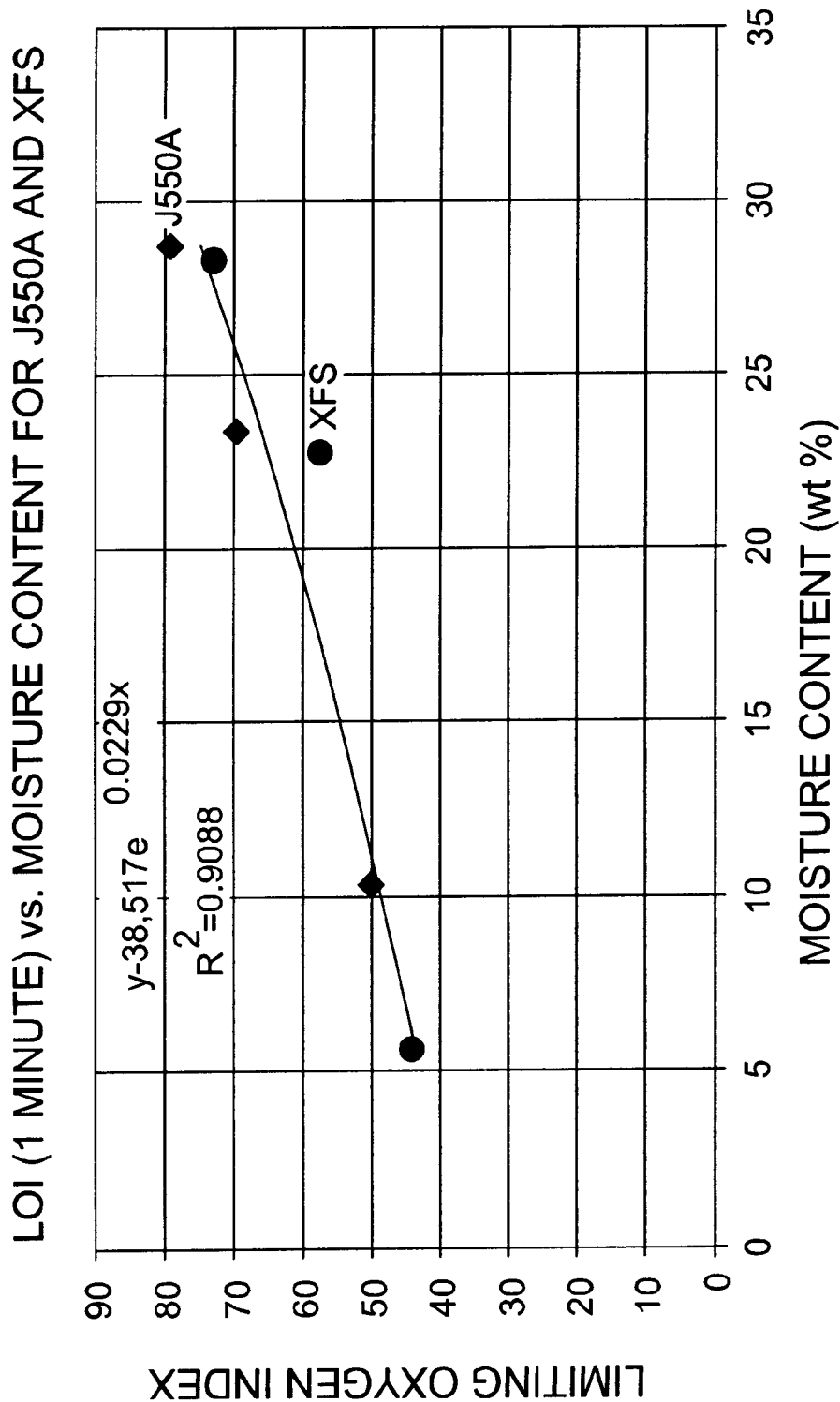
FIG. 12 is a graph illustrating the effect of moisture content on the Limiting Oxygen Index of representative SAPs.

As shown in FIG. 12, limiting oxygen indexes of J550A and XFS increase as the moisture content in these SAPs increase. Therefore, the water molecules absorbed and bonded by these SAPs enhance the flame-retardancy of the SAPs.

Figure 13:
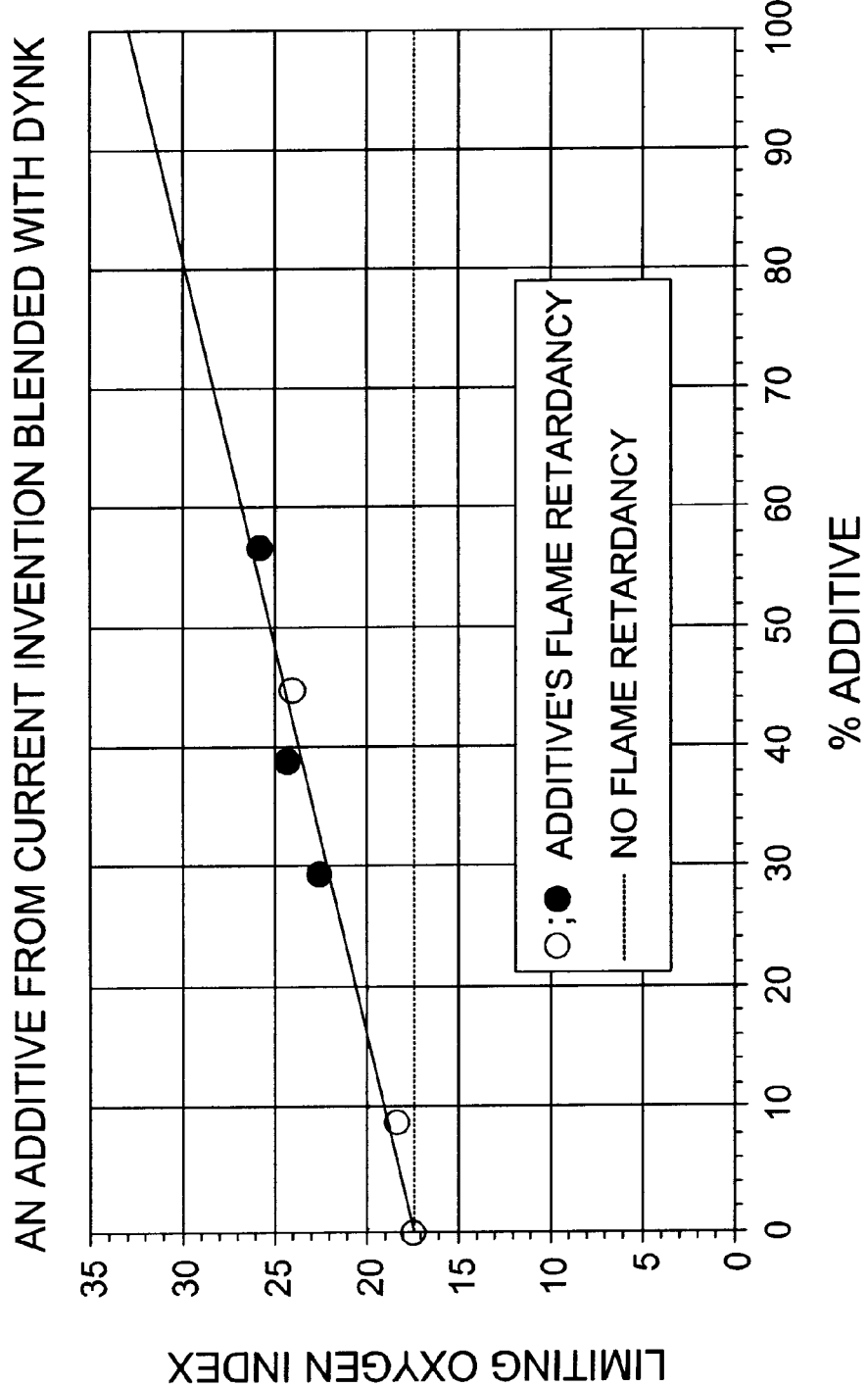
FIG. 13 is a graph illustrating Limiting Oxygen Index of a composition versus percentage of representative SAPs utilized in the composition.

As shown in FIG. 13, the test data obtained from Examples 1-1 and 1-2 is provided in graphic form, with the dashed line representing projected results which would be anticipated if the addition of SAPs (XFS or J550A) to a product were to have a negligible influence on the tested characteristics of the product. Based on the actual test data (as indicated by the solid line), it can be seen that the addition of SAPs to a product increases the LOI of the product and, in this instance, increases the LOI in an amount directly proportional to the amount of SAPs added.

This conclusion is evident even though the SAPs contained a relatively low moisture level. Additionally, it has been shown hereinbefore, that increasing the moisture level in the SAPs can increase the flame-retarding characteristics of the products (FIGS. 9–12). The amount of moisture suitable for use in "pre-loading" the SAPs will, however, vary depending on the particular application.

The moisture level of a given SAP was determined first by weighing out three samples of about 2 grams each and recording their weight. The samples were then placed in a hot air oven for 2 hours at 100° C. Afterwards, the samples were immediately placed in a desiccator to cool for 15 minutes. Then the samples were weighed again and their weights were recorded. The moisture content of a given sample was calculated as follows:

$$M = (B-A)100/B$$

where: M is Moisture Content (wt %); B is weight of sample before drying; and, A is weight of the sample after drying.

The average moisture content and standard deviation for the three sets of SAPs samples and the six sets of "aged" SAPs samples are provided hereinafter in Table 17.

TABLE 17

Moisture Content of SAPs

| Sample | Moisture (wt %) | Std. Dev. (wt %) |
|---|---|---|
| Elf Atochem XFS | 5.55 | 0.16 |
| Elf Atochem XFS, aged 4 hrs. | 22.65 | 0.68 |
| Elf Atochem XFS, aged 7 hrs. | 28.27 | 3.41 |
| Aqua Keep J550A | 10.30 | 0.04 |
| Aqua Keep J550A, aged 4 hrs. | 23.29 | 1.08 |
| Aqua Keep J550A, aged 7 hrs. | 28.68 | 0.38 |
| Stockhausen CA-100 | 10.02 | 0.30 |
| Stockhausen CA-100, aged 4 hrs. | 21.67 | 0.76 |
| Stockhausen CA-100, aged 7 hrs. | 26.41 | 0.48 |

Test Series III

Another method that was used to demonstrate the flame-retarding capabilities of the SAPs was to determine the heat of combustion of each composition. The heat of combustion experiments were carried out in an adiabatic Oxygen Bomb Calorimeter (Model 1281, manufactured by Parr Instrument Company) according to the procedure outlined in its manual. This procedure closely follows the standard procedure as outlined in ASTM D5865-98.

EXAMPLE 3-1

In this example, two samples of each of the following compositions were tested (wt % XFS/w % DYNK): 0/100; 29.7/70.3; 39.1/60.9; 56.8/43.2; and, 100/0. The results of each trial from the experiments were averaged and are provided hereinafter in Table 18.

TABLE 18

Heat of Combustion (XFS in DYNK)

| Composition (wt % XFS) | Heat of Combustion (BTU/lb) |
|---|---|
| 0 | 20,113 |
| 29.7 | 15,737 |
| 39.1 | 14,403 |
| 56.8 | 12,168 |
| 100 | 5,951 |

EXAMPLE 3-2

In this example, heat of combustion experiments were carried out according to the procedure described hereinbefore in Example 3-1. Two samples of each of the following compositions were tested (wt % J550A/wt % DYNK): 0/100; 9.1/90.9; 44.4/55.6; and, 100/0. The results of each trial form the experiments were averaged and are provided hereinafter in Table 19.

TABLE 19

Heat of Combustion (J550A in DYNK)

| Composition (wt % J550A) | Heat of Combustion (BTU/lb) |
|---|---|
| 0 | 20,113 |
| 9.1 | 18,897 |
| 44.4 | 13,842 |
| 100 | 5,967 |

Figure 14:
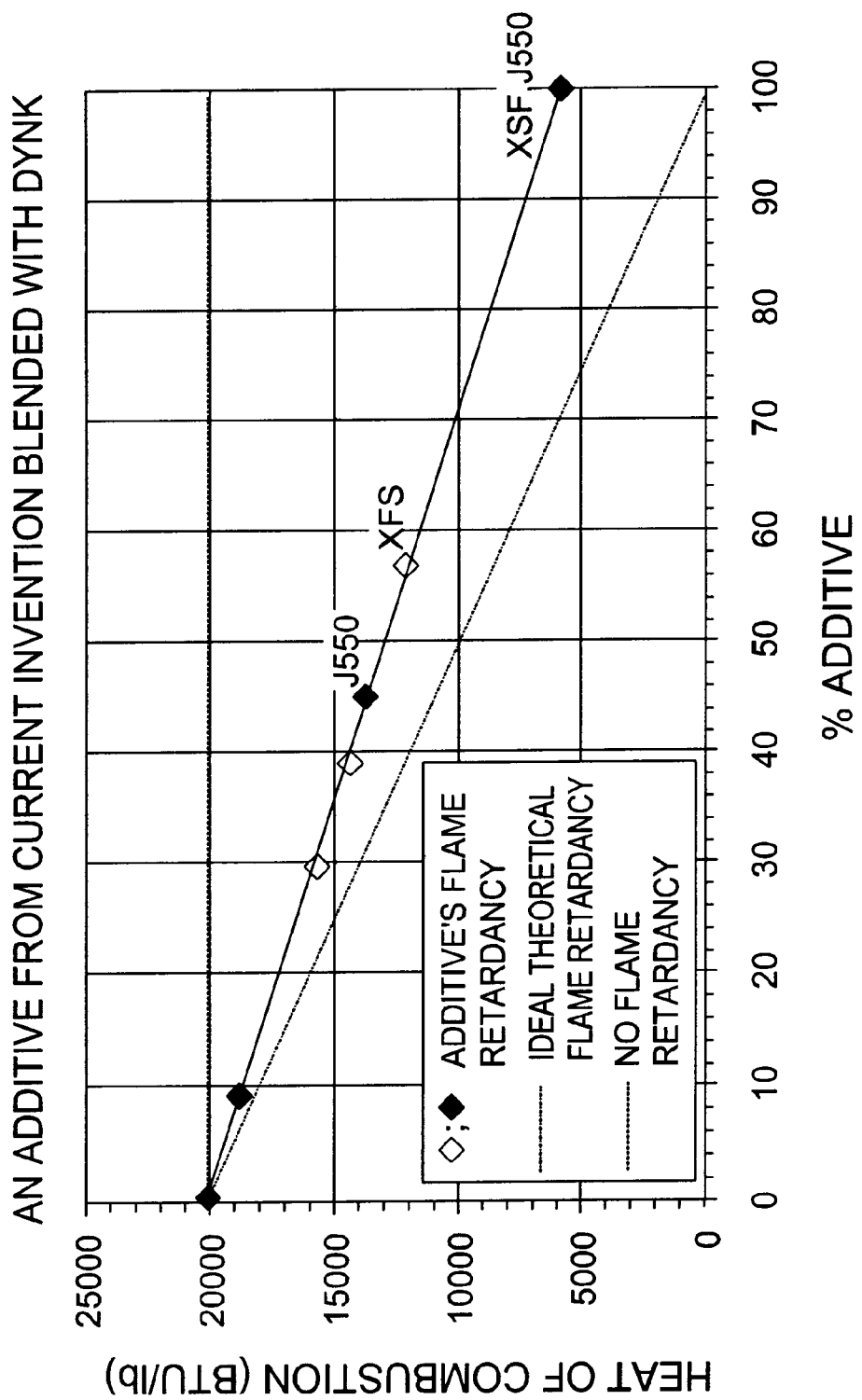
FIG. 14 is a graph illustrating Heat of Combustion of a composition versus percentage of representative SAPs utilized in the composition.

As shown in FIG. 14, the test data obtained from Examples 3-1 and 3-2 is provided in graphic form, with the upper dashed line representing projected results which would be anticipated if the addition of SAPs (XFS or J550A) to the product were to have a negligible influence on the tested characteristics of the product. The lower dashed line represents projected results which would be anticipated if the addition of SAPs (XFS or J550A) to the product were found to have an ideal influence on the tested characteristics of the composition. Based on the actual test data (as indicated by the solid line), it can be seen that the addition of SAPs to a product decreases the heat of combustion of the composition and, in this instance, decreases the heat of combustion in an amount directly proportional to the amount of SAPs added.

Test Series IV

This series was conducted to determine the LOIs of tape specimens which incorporate SAPs for water-blocking. The specimens were subjected to testing as described in ASTM D 2863-95, Type D, described hereinbefore. Moisture content of the tapes was also measured.

EXAMPLE 4-1

In this example, specimens were formed from the following tapes: GFR 1230, manufactured by GECA-TAPES; Lantor 3E-244 (containing 4 g/ft$^2$ of SAPs), manufactured by Lantor, Inc.; and, Lantor x38432, a custom made tape with higher SAP loading, (containing 8 g/ft$^2$ of SAPs). The LOI for each tape is shown hereinafter in Table 20.

TABLE 20

Limiting Oxygen Index of Tape Specimens

| Tape (Avg. Moisture Content) | Trial 1 | Trial 2 | Trial 3 | Average |
|---|---|---|---|---|
| GFR 1230 (8.07%) | 27.2 | 26.5 | 27.0 | 26.9 |
| Lantor x38432 (6.55%) | 25.0 | 26.0 | 25.0 | 25.3 |
| Lantor 3E-244 (9.49%) | 24.0 | 24.0 | 24.0 | 24.0 |

The average moisture content was determined using the procedure described hereinbefore. The data is shown hereinafter in Table 21.

TABLE 21

Moisture Content (%) of Tape Specimens

| Tape | Trial 1 | Trial 2 | Trial 3 | Average |
|---|---|---|---|---|
| GFR 1230 | 8.33 | 7.754 | 8.136 | 8.07 |
| Lantor x38432 | 6.486 | 6.913 | 6.237 | 6.55 |
| Lantor 3E-244 | 9.443 | 9.663 | 9.374 | 9.49 |

EXAMPLE 4-2

This series was conducted to determine the LOIs of tape specimens after the specimens were aired for 3 days. The specimens were then subjected to testing as described in Example 4-1. The LOI for each tape is shown hereinafter in Table 22.

TABLE 22

Limiting Oxygen Index of Aired Tape Specimens

| Tape | Trial 1 | Trial 2 | Trial 3 | Average |
|---|---|---|---|---|
| Lantor x38432 | 28.5 | 26.5 | 26.5 | 27.2 |
| Lantor 3E-244 | 25.5 | 26.0 | 25.5 | 25.7 |

The average moisture content was determined using the procedure described hereinbefore. The data is shown hereinafter in Table 23.

TABLE 23

Moisture Content (%) of Aired Tape Specimens

| Tape | Trial 1 | Trial 2 | Trial 3 | Average |
|---|---|---|---|---|
| Lantor x38432 | 16.349 | 16.437 | 16.999 | 16.59 |
| Lantor 3E-244 | 14.709 | 14.649 | 14.411 | 14.59 |

Based on the actual test data, it can be seen that the addition of SAPs to a water-blocking tape increases the LOI of the tape in proportion to the amount of SAPs added to the tape. In addition, it can be seen that the addition of moisture to the SAPs of a water-blocking tape increases the LOI of the tape in proportion to the amount of moisture added to the SAPs in the tape.

Test Series V

This series was conducted in order to determine the absorbency of tape specimens in water (i.e. distilled water or sea water).

EXAMPLE 5-1

In this example, specimens were tested in accordance with a standard free swell test in order to determine the absorbency of tape specimens in distilled water. The specimens were formed from the following tapes: GFR 1230; Lantor 3E-244; and, Lantor x38432. Each specimen, which was 1 inch wide by 6 inches long, was weighed and the weight recorded. Each specimen was placed in a separate container. Approximately 800 ml of distilled water per gram of specimen was poured into the container, with the specimen and water being stirred as needed to ensure adequate mixing. After 30 minutes, the container contents were strained on a U.S. Standard Testing Sieve (NO. 35) for 10 minutes. Material remaining on the sieve after straining was weighed and the weight recorded. Absorbency for each sample was calculated by the following formula:

Absorbency=[(gel mass)−(initial sample mass)]/initial sample mass

Absorbency data for each tape is shown hereinafter in Table 24.

TABLE 24

Absorbency of Tape Specimens in Distilled Water

| Tape | Avg. Absorbency | Absorbency (σ) | Absorbency (σ %) |
|---|---|---|---|
| GFR 1230 | 73.7 | 4.6 | 6.2 |
| Lantor x38432 | 311.7 | 7.6 | 2.4 |
| Lantor 3E-244 | 273.5 | 16.4 | 6.0 |

EXAMPLE 5-2

In this example, specimens were tested in accordance with the procedures set forth in Example 5-1, with the exception of approximately 50 ml of sea water per gram of specimen being poured into the container versus the distilled water. Absorbency data for each tape is shown hereinafter in Table 25.

TABLE 25

Absorbency of Tape Specimens in Sea Water

| Tape | Avg. Absorbency | Absorbency (σ) | Absorbency (σ %) |
|---|---|---|---|
| GFR 1230 | 3.8 | 0.6 | 15.8 |
| Lantor x38432 | 10.3 | 0.2 | 1.9 |
| Lantor 3E-244 | 9.9 | 0.6 | 6.4 |

EXAMPLE 5-3

Figure 15:
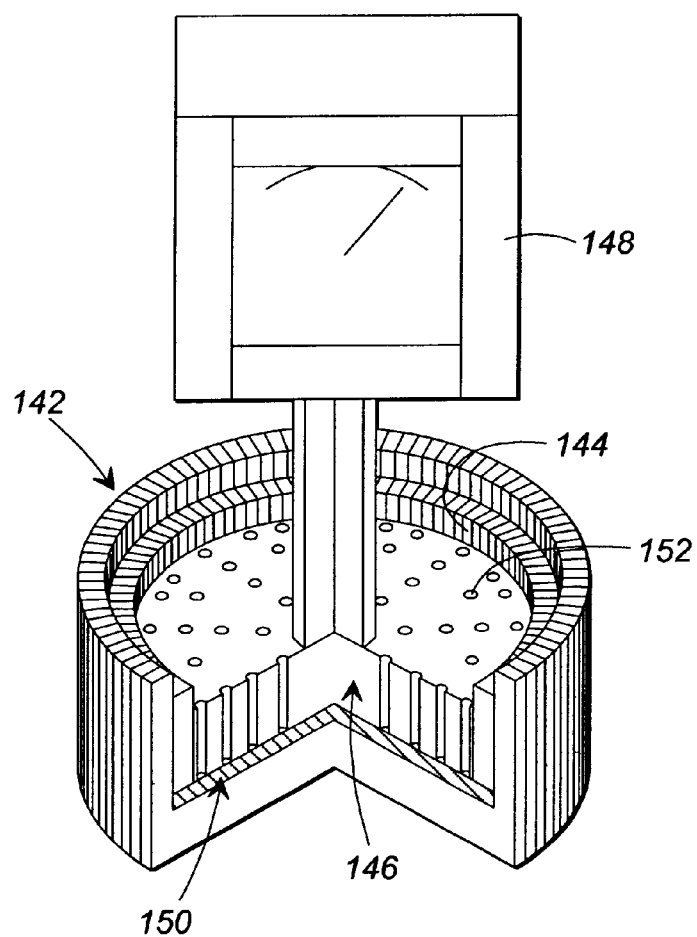
FIG. 15 is a perspective view of representative test equipment utilized in analyzing the absorbency of tapes formed in accordance with the present invention.

In this example, testing was conducted in accordance with a cup and ram test in order to determine the swell height of tape specimens in distilled water. As shown in FIG. 15, the cup and ram test utilizes a cup 142. The cup includes an interior side wall 144 which cooperates with a ram 146 so that the ram can reciprocate vertically within the cup. The ram is attached to a meter 148 which measures the vertical displacement of the ram. In accordance with test procedures, a circle of tape 150 (e.g. GFR 1230; Lantor 3E-244; and, Lantor x38432), which was sized to coincide with the inside area of the cup, was placed into the cup and the ram was lowered into the cup on top of the tape. Eighty grams of distilled water was poured into the cup so that the water could flow through holes 152 formed through the ram, thus allowing the water to contact the tape. After a predetermined period of time, the vertical displacement of the ram was recorded. Average swell height data compared on an equal surface area basis for each tape is shown hereinafter in Table 26.

TABLE 26

Swell Height of Tape Specimens in Distilled Water (1 minute)

| Tape | Avg. Swell Ht. (cm) | Swell Std. Dev. (σ cm) | Swell Std. Dev. (σ %) |
|---|---|---|---|
| GFR 1230 | 0.7991 | 0.0179 | 2.2 |
| Lantor x38432 | 1.4027 | 0.1337 | 9.5 |
| Lantor 3E-244 | 1.3393 | 0.0879 | 6.6 |

EXAMPLE 5-4

In this example, testing was conducted in order to determine the swell height of tape specimens in distilled water. The tests were conducted in accordance with the procedures set forth in Example 5-3, with the exception of the specimens being allowed to stand for two minutes prior to recording specimen swell height data. Average swell height data compared on an equal surface area basis for each tape is shown hereinafter in Table 27.

TABLE 27

Swell Height of Tape Specimens in Distilled Water (2 minutes)

| Tape | Avg. Swell Ht. (cm) | Swell Std. Dev. (σ cm) | Swell Std. Dev. (σ %) |
|---|---|---|---|
| GFR 1230 | 0.8568 | 0.0246 | 2.9 |
| Lantor x38432 | 1.4127 | 0.1435 | 10.2 |
| Lantor 3E-244 | 1.3409 | 0.0892 | 6.7 |

EXAMPLE 5-5

In this example, testing was conducted in order to determine the swell height of tape specimens in distilled water.

The tests were conducted in accordance with the procedures set forth in Examples 5-3 and 5-4, with the exception of the specimens being allowed to stand for ten minutes prior to recording specimen swell height data. Average swell height data compared on an equal surface area basis for each tape is shown hereinafter in Table 28.

TABLE 28

Swell Height of Tape Specimens in Distilled Water (10 minutes)

| Tape | Avg. Swell Ht. (cm) | Swell Std. Dev. (σ cm) | Swell Std. Dev. (σ %) |
|---|---|---|---|
| GFR 1230 | 0.8665 | 0.0238 | 2.7 |
| Lantor x38432 | 1.4130 | 0.1425 | 10.1 |
| Lantor 3E-244 | 1.3416 | 0.0897 | 6.7 |

Based on the actual test data, it can be seen that the addition of SAPs to a water-blocking tape increases the swell height of the tape in proportion to the amount of SAPs added to the tape on an equal surface area basis.

EXAMPLE 5-6

In this example, testing was conducted in order to determine the swell height of tape specimens in sea water. The tests were conducted as described in Example 5-3, with the exception that sea water was used in place of distilled water. Average swell height data compared on an equal surface area basis for each tape is shown hereinafter in Table 29.

TABLE 29

Swell Height of Tape Specimens in Sea Water (1 minute)

| Tape | Avg. Swell Ht. (cm) | Swell Std. Dev. (σ cm) | Swell Std. Dev. (σ %) |
|---|---|---|---|
| Lantor x38432 | 0.2047 | 0.0027 | 1.3 |
| Lantor 3E-244 | 0.1005 | 0.0028 | 2.8 |

EXAMPLE 5-7

In this example, testing was conducted in order to determine the swell height of tape specimens in sea water. The tests were conducted in accordance with the procedures set forth in Example 5-6, with the exception of the specimens being allowed to stand for two minutes prior to recording specimen swell height data. Average swell height data compared on an equal surface area basis for each tape is shown hereinafter in Table 30.

TABLE 30

Swell Height of Tape Specimens in Sea Water (2 minutes)

| Tape | Avg. Swell Ht. (cm) | Swell Std. Dev. (σ cm) | Swell Std. Dev. (σ %) |
|---|---|---|---|
| Lantor x38432 | 0.2163 | 0.0032 | 1.5 |
| Lantor 3E-244 | 0.1031 | 0.0028 | 2.7 |

EXAMPLE 5-8

In this example, testing was conducted in order to determine the swell height of tape specimens in sea water. The tests were conducted in accordance with the procedures set forth in Examples 5-6 and 5-7, with the exception of the specimens being allowed to stand for ten minutes prior to recording specimen swell height data. Average swell height data compared on an equal surface area basis for each tape is shown hereinafter in Table 31.

TABLE 31

Swell Height of Tape Specimens in Sea Water (10 minutes)

| Tape | Avg. Swell Ht. (cm) | Swell Std. Dev. (σ cm) | Swell Std. Dev. (σ %) |
|---|---|---|---|
| Lantor x38432 | 0.2235 | 0.0038 | 1.7 |
| Lantor 3E-244 | 0.1010 | 0.0025 | 2.5 |

Based on the actual test data, it can be seen that the addition of SAPs to a water-blocking tape increases the swell height of the tape in proportion to the amount of SAPs added to the tape on an equal surface area basis. Again, it is evident that the electrolytes in sea water have a devastating affect on the swell height of the tape when compared to the swell height of the tape in distilled water.

Test Series VI

In order to show that the prior art flame retardants inhibit the absorbency of SAPs, a series of tests was performed to determine the absorbency of J550A when increasing amounts of flame retardants or salts were added. The substances that were tested were magnesium hydroxide, zinc borate, potassium chloride, sodium chloride, and calcium chloride. Magnesium hydroxide is the substance used as a prior art flame retardant in the GFR 1230 tape.

EXAMPLE 6-1

Testing was performed as in Example 5-1, except samples of J550A powder weighing about 0.5 g were used. Also, increasing amounts of magnesium hydroxide, as shown in Table 32, were added to 400 g of distilled water for each trial. The results of the testing are found hereinafter in Table 32.

TABLE 32

Magnesium Hydroxide's Effect on the Absorbency of J550A

| Weight % $Mg(OH)_2$ in Distilled Water | Absorbency |
|---|---|
| 0.01 | 534.9 |
| 0.02 | 510.0 |
| 0.1 | 381.7 |
| 0.2 | 338.3 |
| 0.9 | 280.7 |
| 1.5 | 227.7 |
| 2.0 | 218.9 |
| 2.5 | 198.3 |
| 3.0 | 188.5 |

EXAMPLE 6-2

Testing was performed as in Example 6-1, except zinc borate was used in place of magnesium hydroxide for each trial. The results of the testing are found hereinafter in Table 33.

TABLE 33

Zinc Borate's Effect on the Absorbency of J550A

| Weight % $2ZnO*3B_2O_3*3.5H_2O$ in Distilled Water | Absorbency |
|---|---|
| 0.01 | 498.8 |
| 0.02 | 471.5 |
| 0.1 | 267.4 |
| 0.2 | 173.4 |

TABLE 33-continued

Zinc Borate's Effect on the Absorbency of J550A

| Weight % 2ZnO*3B$_2$O$_3$*3.5H$_2$O in Distilled Water | Absorbency |
| --- | --- |
| 0.9 | 93.5 |
| 1.5 | 93.6 |
| 2.0 | 102.6 |
| 2.5 | 107.2 |
| 3.0 | 109.5 |

EXAMPLE 6-3

Testing was performed as in Example 6-1, except potassium chloride was used in place of magnesium hydroxide for each trial. The results of the testing are found hereinafter in Table 34.

TABLE 34

Potassium Chloride's Effect on the Absorbency of J550A

| Weight % KCl in Distilled Water | Absorbency |
| --- | --- |
| 0.01 | 411.7 |
| 0.02 | 361.2 |
| 0.1 | 203.4 |
| 0.2 | 162.1 |
| 0.9 | 87.7 |
| 1.5 | 70.3 |
| 2.0 | 60.6 |
| 2.5 | 58.0 |
| 3.0 | 51.9 |

EXAMPLE 6-4

Testing was performed as in Example 6-1, except sodium chloride was used in place of magnesium hydroxide for each trial. The results of the testing are found hereinafter in Table 35.

TABLE 35

Sodium Chloride's Effect on the Absorbency of J550A

| Weight % NaCl in Distilled Water | Absorbency |
| --- | --- |
| 0.01 | 394.6 |
| 0.02 | 351.6 |
| 0.1 | 189.3 |
| 0.2 | 138.7 |
| 0.9 | 75.1 |
| 1.5 | 55.4 |
| 2.0 | 51.1 |
| 2.5 | 42.1 |
| 3.0 | 44.4 |

EXAMPLE 6-5

Testing was performed as in Example 6-1, except calcium chloride was used in place of magnesium hydroxide for each trial. The results of the testing are found hereinafter in Table 36.

TABLE 36

Calcium Chloride's Effect on the Absorbency of J550A

| Weight % CaCl$_2$ in Distilled Water | Absorbency |
| --- | --- |
| 0.01 | 370.7 |
| 0.02 | 287.6 |
| 0.1 | 5.8 |
| 0.2 | 4.5 |
| 0.9 | 2.3 |
| 1.5 | 1.6 |
| 2.0 | 2.0 |
| 2.5 | 1.7 |
| 3.0 | 2.1 |

Figure 16:
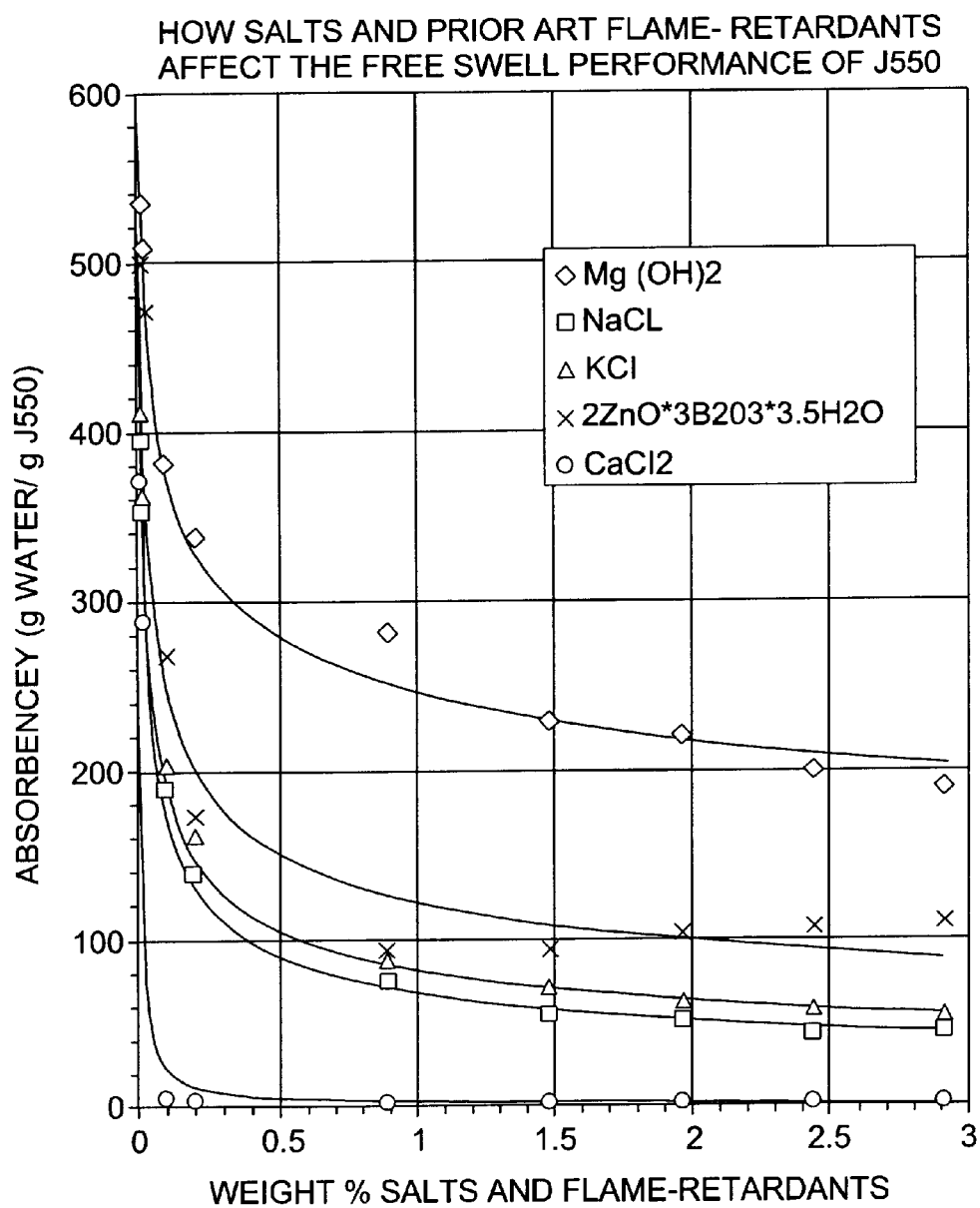
FIG. 16 is a graph illustrating the effects of prior art flame-retardants on the absorbency of a representative SAP.

In order to compare the data presented in Examples 6-1 through 6-5, the data was plotted as shown in FIG. 16. It can be seen from this figure that even a small amount of flame retardants or salts in the presence of J550A reduces the absorbency of the SAP to the point where the SAPs could become incapable of water blocking. Additionally, curves were added to determine an equation that best fits each data set. The equations for these curves are provided hereinafter in Table 37.

TABLE 37

Equations for Absorbency versus Weight of Flame-Retardants/or Salts

| Material | Equations | |
| --- | --- | --- |
| Mg(OH)$_2$ | $y = 246.21x^{-0.1818}$ | ($R^2 = 0.9803$) |
| 2ZnO*3B$_2$O$_3$*3.5H$_2$O | $y = 122.66x^{-0.3085}$ | ($R^2 = 0.9379$) |
| KCl | $y = 81.822x^{-0.3722}$ | ($R^2 = 0.9951$) |
| NaCl | $y = 67.954x^{-0.4083}$ | ($R^2 = 0.9931$) |
| CaCl$_2$ | $y = 2.7947x^{-0.9402}$ | ($R^2 = 0.8621$) |

Observations

Test data obtained during the aforementioned test series revealed the following: (1) the addition of SAPs to a product increases the LOI of the product and, in this instance, increases the LOI in an amount directly proportional to the amount of SAPs added; (2) the addition of SAPs to a product decreases the heat of combustion of the product and, in this instance, decreases the heat of combustion in an amount directly proportional to the amount of SAPs added; (3) the addition of SAPs to a water-blocking tape increases the LOI of the tape in proportion to the amount of SAPs added to the tape; (4) the addition of SAPs to a water-blocking tape increases the absorbency of the tape in proportion to the amount of SAPs added to the tape; (5) the LOIs of SAPs increase as the moisture content in the SAPs increase; and, (6) the presence of magnesium hydroxide and zinc borates, well known prior art flame-retardants, can drastically reduce the absorbency of SAPs.

Based on this data, it has been determined that SAPs may be effectively utilized as flame-retardant additives for use with water-blocking tapes without producing a degradation in the total water-absorbing capacity of the tapes. In particular, the tape 10 of the present invention effectively utilizes SAPs additives for imparting both flame-retarding and water-blocking characteristics to the tape. This is accomplished without compromising the total water-absorbing capacity of the tape, such as was common when practicing the prior art, e.g. adding prior art flame-retardants (salts) to the SAPs of water-blocking tapes.

For ease of description, and not for purposes of limitation, tapes 10 incorporating four grams and eight grams of SAPs per square foot were utilized during the aforementioned test series. Additionally, moisture content varied between approximately 5 percent and approximately 29 percent, by weight. Both the amount of SAPs utilized and the moisture content of the SAPs utilized in a particular application may, however, vary depending upon the needs of the application. In particular, it has been determined that effective flame-retarding in tapes can be achieved by pre-loading the tapes with a moisture content of as low as approximately 2 percent (typical commercially available tapes have heretofore incorporated moisture contents of between approximately 1 and 2 percent). Furthermore, due to manufacturing and/or design considerations, it has heretofore been desirable to produce tapes 10 which have a limited thickness. Since the amount of SAPs utilized in a tape has an effect, to a degree, on tape thickness, tapes 10 with a thickness of less than approximately 0.016 inches are preferred, thus resulting in a preferable loading of less than approximately 12 $g/ft^2$.

Figure 17:
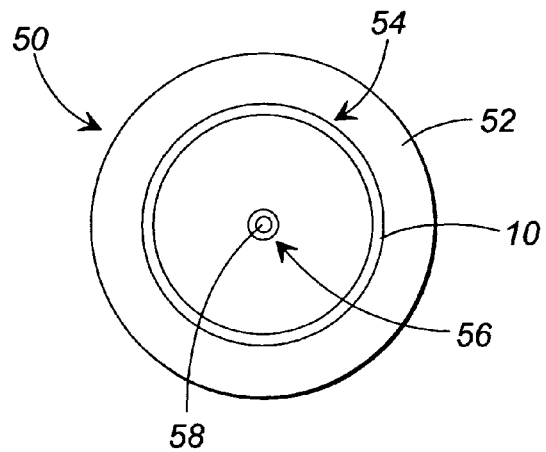
FIG. 17 is a cross-sectional end view of a representative cable incorporating the tape of the present invention.

In accordance with another aspect of the present invention, tape 10 can be incorporated into structures such as cable 50 (FIG. 17), for instance. Cable 50 incorporates an outer jacket 52, formed of plastic, which surrounds a core 54. Core 54 includes transmission medium 56, such as optical fiber 58. Between outer jacket 52 and core 54, one or more layers of tape 10 are provided. So configured, tape 10 provides a water-blocking layer between the outer jacket and the transmission medium, thereby potentially preventing water from entering the core. Additional embodiments can incorporate tape 10 in various other arrangements so that the tape is disposed between the outer jacket and the transmission medium.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A cable comprising:
    a core having a transmission medium;
    an outer jacket surrounding said core; and
    a tape disposed between said core and said outer jacket, said tape comprising:
        a first layer formed of at least one of the group consisting of: spun bonded non-woven polyester material, nylon spun bonded fabric, non-woven glass, polypropylene melt blown non-woven fabric, polyurethane spun bonded fabric, and TCF cellulose fabric; and
    superabsorbent polymers applied to said first layer, said superabsorbent polymers having a moisture content of greater than approximately 2 percent, by weight, whereby said moisture content improves flame-retarding of said cable.

2. The cable of claim 1, wherein said superabsorbent polymers comprise at least one of the group consisting of polyacrylates, polyacrylamides, polyvinylalcohols, copolymers of polyacrylates, copolymers of polyacrylamides, copolymers of polyvinylalcohols, copolymers of polyacrylates and polyacrylamides, copolymers of polyacrylates and polyvinylalcohols, and copolymers of polyacrylamides and polyvinylalcohols, said tape having greater than 6.22 grams of said superabsorbent polymers per square foot.

3. The cable of claim 1, wherein said tape has at least 8 grams of said superabsorbent polymers per square foot.

4. The cable of claim 3, wherein said moisture content is at least approximately 5 percent, by weight.

5. A cable comprising:
    a core having a transmission medium;
    an outer jacket surrounding said core; and
    a tape disposed between said core and said outer jacket, said tape having a first layer and superabsorbent polymers, said superabsorbent polymers loaded in an amount greater than 6.22 grams per square foot of said tape.

6. The cable of claim 5, wherein said superabsorbent polymers comprise at least one of the group consisting of polyacrylates, polyacrylamides, polyvinylalcohols, copolymers of polyacrylates, copolymers of polyacrylamides, copolymers of polyvinylalcohols, copolymers of polyacrylates and polyacrylamides, copolymers of polyacrylates and polyvinylalcohols, and copolymers of polyacrylamides and polyvinylalcohols.

7. The cable of claim 5, wherein said tape comprises said superabsorbent polymers at a loading of at least approximately 8 grams per square foot.

8. The cable of claim 5, wherein said first layer is formed of at least one of the group consisting of: spun bonded non-woven polyester material, nylon spun bonded fabric, non-woven glass, polypropylene melt blown non-woven fabric, polyurethane spun bonded fabric, and TCF cellulose fabric.

9. The cable of claim 5, wherein said tape has a total weight and said superabsorbent polymers comprise at least 50% of said total weight of said tape.

10. The cable of claim 7, wherein the first layer is impregnated with said superabsorbent polymers.

11. The cable of claim 7, wherein said tape has a second layer and said superabsorbent polymers are at least partially disposed between said first and second layers.

12. The cable of claim 7, wherein said tape has a thickness of less than approximately 0.016 inches.

13. A water-blocking tape with flame-retarding comprising:
    a first layer;
    superabsorbent polymers applied to said first layer, said superabsorbent polymers having a moisture content of greater than approximately 2 percent, by weight.

14. The tape of claim 13, wherein said tape has greater than 6.22 grams of said superabsorbent polymers per square foot.

15. The tape of claim 5, wherein said tape has a total weight and said superabsorbent polymers comprise at least 50% of said total weight of said tape.

* * * * *